(12) United States Patent
Ishikawa et al.

(10) Patent No.: US 8,339,678 B2
(45) Date of Patent: Dec. 25, 2012

(54) APPARATUS, SYSTEM, AND METHOD OF PROCESS CONTROL BASED ON THE DETERMINATION OF EMBEDDED INFORMATION

(75) Inventors: Masaaki Ishikawa, Tokyo (JP); Hiroshi Shimura, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 12/379,222

(22) Filed: Feb. 17, 2009

(65) Prior Publication Data

US 2009/0213397 A1 Aug. 27, 2009

(30) Foreign Application Priority Data

Feb. 22, 2008 (JP) ................................. 2008-042234

(51) Int. Cl.
*H04N 1/40* (2006.01)
*G06K 9/00* (2006.01)

(52) U.S. Cl. .......... 358/3.28; 358/1.9; 358/2.1; 358/3.1; 358/3.26; 358/1.4; 358/1.8; 358/2.99; 358/3.01; 358/3.02; 358/1.12; 358/1.14; 358/1.16; 358/1.18; 358/501; 358/515; 358/529; 358/535; 358/426.06; 382/100; 382/232; 382/135; 382/137; 382/160; 382/165; 382/171; 382/172; 382/173; 382/174; 382/175; 382/195; 382/248; 382/250; 382/284; 380/22; 380/43; 380/51; 380/54; 380/201; 380/203; 380/223; 380/226; 380/228; 380/229; 380/250; 380/278

(58) Field of Classification Search .................... None
See application file for complete search history.

(56) References Cited

U.S. PATENT DOCUMENTS

| | | | |
|---|---|---|---|
| 5,798,844 A | | 8/1998 | Sakano et al. |
| 6,069,665 A | * | 5/2000 | Ikeda et al. .................... 348/478 |
| 6,421,145 B1 | | 7/2002 | Kurita et al. |
| 7,227,661 B2 | * | 6/2007 | Matsunoshita .............. 358/1.15 |
| 7,609,851 B2 | * | 10/2009 | Guan et al. ..................... 382/100 |
| 7,613,318 B2 | * | 11/2009 | Yamaguchi et al. .......... 382/100 |
| 2003/0179412 A1 | * | 9/2003 | Matsunoshita .............. 358/3.28 |
| 2004/0184065 A1 | | 9/2004 | Guan et al. |
| 2005/0041263 A1 | | 2/2005 | Ishikawa et al. |
| 2005/0052682 A1 | | 3/2005 | Ishikawa et al. |
| 2005/0151989 A1 | | 7/2005 | Shimura et al. |
| 2006/0209326 A1 | | 9/2006 | Higashiura |
| 2006/0256362 A1 | * | 11/2006 | Guan et al. .................... 358/1.14 |

(Continued)

FOREIGN PATENT DOCUMENTS

CN 1834989 9/2006

(Continued)

OTHER PUBLICATIONS

Japanese Office Action dated Aug. 16, 2011 issued in corresponding Japanese Application No. 2008-042234.

(Continued)

*Primary Examiner* — Steven Kau
(74) *Attorney, Agent, or Firm* — Harness, Dickey & Pierce, P.L.C.

(57) ABSTRACT

An apparatus, system, and method for image processing are disclosed, each of which obtains a mark from image data, detects additional information in the mark, determines whether the mark is detected in the mark to generate a determination result, and controls processing performed by an image processing apparatus with respect to the image data based on the determination result.

19 Claims, 17 Drawing Sheets

U.S. PATENT DOCUMENTS

| | | |
|---|---|---|
| 2007/0003341 A1 | 1/2007 | Guan et al. |
| 2007/0171480 A1* | 7/2007 | Matsunoshita .............. 358/3.28 |
| 2007/0206866 A1 | 9/2007 | Nakai et al. |

FOREIGN PATENT DOCUMENTS

| | | |
|---|---|---|
| JP | 2004-274092 | 9/2004 |
| JP | 2005-234970 | 9/2005 |
| JP | 2007-037099 | 2/2007 |
| JP | 2008-011149 | 1/2008 |

OTHER PUBLICATIONS

European Office Action dated Mar. 31, 2011 for corresponding European Application No. 09250459.6.

European Search Report dated Jun. 5, 2009 for corresponding European Application No. 09250459.6.

Office Action dated Dec. 31, 2011, in corresponding Chinese Patent Application No. 200910007399.5.

\* cited by examiner

FIG. 9

| OPERATION CONTROL CODE | PROCESSING | | | |
|---|---|---|---|---|
| | PRINT | EMAIL | TRANSFER | FAX |
| -1 | OK | OK | OK | OK |
| 1 | NO | NO | NO | NO |
| 2 | NO | OK WITH ENCRYPTION | OK WITH ENCRYPTION | NO |
| 3 | NO | OK WITH ENCRYPTION AND UNPRINTABLE PDF | OK WITH ENCRYPTION AND UNPRINTABLE PDF | NO |
| 4 | OK | NO | NO | NO |
| 5 | OK | OK WITH ENCRYPTION AND UNPRINTABLE PDF | OK WITH ENCRYPTION AND UNPRINTABLE PDF | NO |
| 6 | OK | OK WITH RESTRICTED DESTINATION | OK WITH RESTRICTED DESTINATION | OK WITH RESTRICTED DESTINATION |

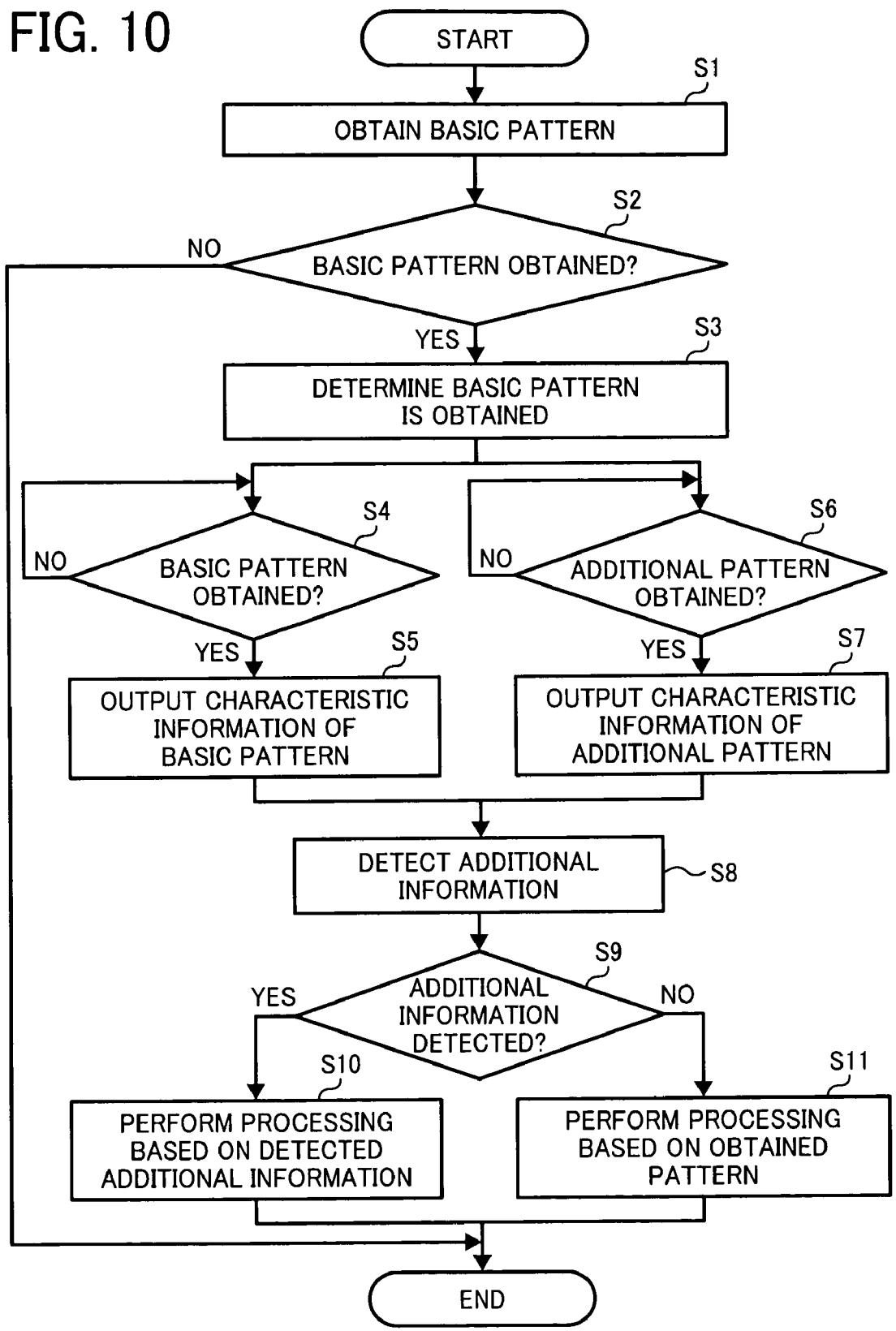

FIG. 14

| OPERATION CONTROL CODE | PROCESSING | | | | |
|---|---|---|---|---|---|
| | PRINT | EMAIL | TRANSFER | FAX | PRIORITY |
| -1 | OK | OK | OK | OK | 7 |
| 1 | NO | NO | NO | NO | 5 |
| 2 | NO | OK WITH ENCRYPTION | OK WITH ENCRYPTION | NO | 1 |
| 3 | NO | OK WITH ENCRYPTION AND UNPRINTABLE PDF | OK WITH ENCRYPTION AND UNPRINTABLE PDF | NO | 2 |
| 4 | OK | NO | NO | NO | 6 |
| 5 | OK | OK WITH ENCRYPTION AND UNPRINTABLE PDF | OK WITH ENCRYPTION AND UNPRINTABLE PDF | NO | 4 |
| 6 | OK | OK WITH RESTRICTED DESTINATION | OK WITH RESTRICTED DESTINATION | OK WITH RESTRICTED DESTINATION | 3 |

US 8,339,678 B2

APPARATUS, SYSTEM, AND METHOD OF PROCESS CONTROL BASED ON THE DETERMINATION OF EMBEDDED INFORMATION

CROSS-REFERENCE TO RELATED APPLICATIONS

This patent application is based on and claims priority under 35 U.S.C. §119 to Japanese Patent Application No. 2008-042234, filed on Feb. 22, 2008, in the Japanese Patent Office, the disclosure of which is hereby incorporated herein by reference.

FIELD OF THE INVENTION

The present invention generally relates to an apparatus, system, and method of process control, and more specifically to an apparatus, system, and method of controlling processing based on a determination result indicating whether additional information embedded in original data or document is detected or a determination result indicating whether detected additional information corresponds to specific processing.

BACKGROUND

With increased awareness for improved security, various techniques have been introduced, that restrict output of a confidential document, for example, as described in the Japanese Patent Application Publication Nos. 2004-274092 and 2007-37099. For example, in the office environment, an image forming apparatus may be programmed such that, when an original document to be processed is determined to be the confidential document, the image forming apparatus prohibits copying of the confidential document or restricts the output of confidential document even when a user instruction for outputting the confidential document is received.

In one example, the confidential document may be embedded with additional information indicating that the document is the confidential document. When the additional information is detected, the image forming apparatus determines that the original document is the confidential document, and prohibits copying of the confidential document.

In another example, the confidential document may be embedded with additional information specifying the authorized processing to be performed on the confidential document. When the additional information is detected, the image forming apparatus determines processing to be performed based on the additional information, and performs the determined processing on the confidential document.

FIG. 1 is a flowchart illustrating operation of controlling processing to be performed on document data according to additional information obtained from the document data. In this example, it is assumed that the additional information is embedded in the form of pattern.

S100 obtains a pattern from the document data to be processed.

S101 determines whether additional information is detected in the pattern obtained at S100. When it is determined that the additional information is detected ("YES" at S101), the operation proceeds to S102. When it is determined that the additional information is not detected ("NO" at S101), the operation ends to allow any desired operation to be performed on the document data.

S102 determines processing to be performed on the document data according to the additional information detected at S101, and the operation ends.

SUMMARY

While the background technique illustrated in FIG. 1 is capable of controlling processing when the additional information is detected in the pattern, it is not capable of controlling processing when the additional information is not detected in the pattern even when the pattern is extracted. In such case, even when the confidential document embedded with the additional information is provided, the image forming apparatus will treat the confidential document as a non-confidential document, and will allow any user to copy the confidential document.

In view of the above, the inventors of the present invention have discovered that there is a need for protecting the confidential document even when the apparatus fails to accurately detect the additional information using the pattern obtained from the document data.

Further, the inventors of the present invention have discovered that there is a need for protecting the confidential document even when the apparatus fails to accurately specify processing that corresponds to the additional information even when the additional information is detected.

Example embodiments of the present invention include an image processing apparatus including: a mark obtaining circuit to obtain a mark from image data, the mark being previously embedded in the image data; an additional information detector circuit to detect additional information in the mark; and a controller to determine whether the additional information is detected in the mark to generate a determination result and to control processing performed by the image processing apparatus with respect to the image data based on the determination result. When the determination result indicates that the additional information is detected, the image processing apparatus is controlled to perform processing that corresponds to the additional information. When the determination result indicates that the additional information is not detected, the image processing apparatus is controlled to perform processing that corresponds to the mark.

Example embodiments of the present invention include an image processing system provided with a processor and a storage device to store a plurality of instructions which, when activated by the processor, cause the processor to function as an image processing apparatus. According to the plurality of instructions, the image processing apparatus: obtains a mark from image data, the mark being previously embedded in the image data; detects additional information in the mark; determines whether the additional information is detected in the mark to generate a determination result; and controls processing performed by the image processing system with respect to the image data based on the determination result. When the determination result indicates that the additional information is detected, the image processing system is controlled to perform processing that corresponds to the additional information. When the determination result indicates that the additional information is not detected, the image processing system is controlled to perform processing that corresponds to the mark.

Example embodiments of the present invention include an image processing method, which includes: obtaining a mark from image data, the mark being previously embedded in the image data; detecting additional information in the mark; determining whether the additional information is detected in the mark to generate a determination result; and controlling processing performed by an image processing apparatus with respect to the image data based on the determination result. When the determination result indicates that the additional information is detected, the image processing apparatus is controlled to perform processing that corresponds to the additional information. When the determination result indicates that the additional information is not detected, the image processing apparatus is controlled to perform processing that corresponds to the mark.

In any one of the above-described examples, the mark may be any desired type of mark including, for example, a pattern, a code such as a bi-dimensional code, etc. Further, in addition to the above-described example embodiments, the present invention may be practiced in various other ways, for example, as a recording medium storing a plurality of instructions which cause a computer to function as the above-described image processing apparatus or a plurality of devices to function as the above-described image processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an illustration for explaining a management table managed by the image processing apparatus of FIG. 7, which stores a operation control code and information regarding the corresponding processing;

FIG. 10 is a flowchart illustrating operation of detecting additional information and controlling processing based on whether the additional information is detected, performed by the image processing apparatus of FIG. 7, according to an example embodiment of the present invention;

FIG. 14 is an illustration for explaining a management table managed by the image processing apparatus of FIG. 7, which stores a operation control code, information regarding the corresponding processing, and priority order information;

Figure 1:
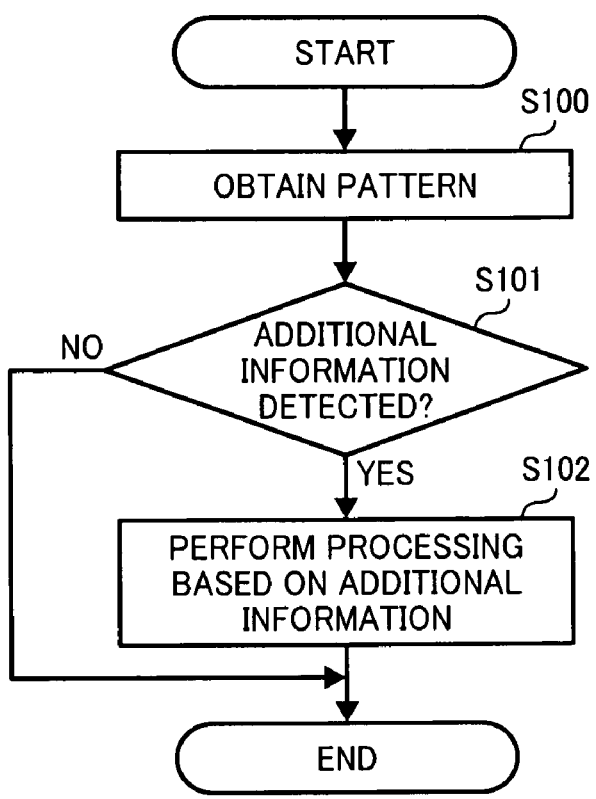
FIG. 1 is a flowchart illustrating operation of controlling processing to be performed on document data using a background technique.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
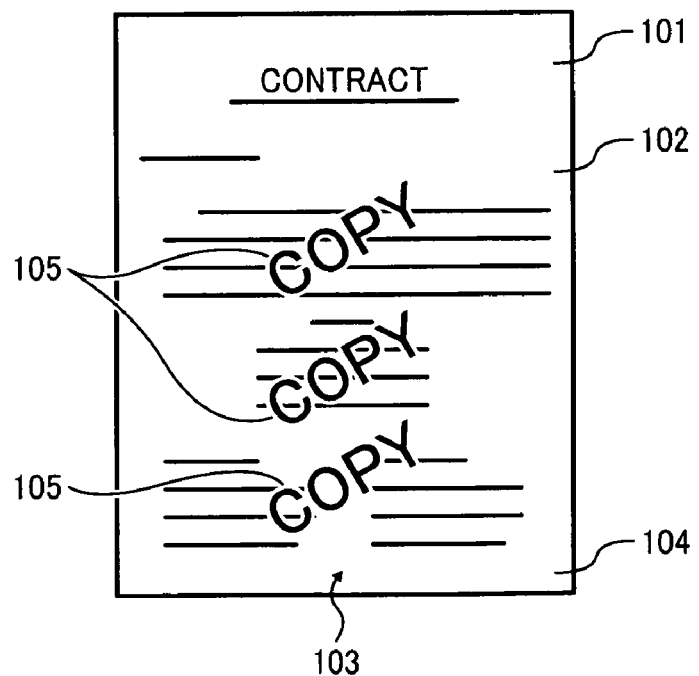
FIG. 2 is an illustration for explaining a document, or document data, embedded with additional information, according to an example embodiment of the present invention.

Referring to FIGS. 2 to 6, an example document 101 is explained. The document 101 illustrated in FIG. 2 is generated by any desired apparatus as a confidential document, which is embedded with additional information. In this example, it is assumed that the additional information is embedded in the form of a first pattern 107 of FIG. 3A and a second pattern 108 of FIG. 3B. The document 101 may be provided to an image processing apparatus 10 of FIG. 7 for processing in any desired format such in the form of electronic format or printed document. For simplicity, the document data 101 and the document 101 may be used interchangeably to both refer to the document 101 in any desired format.

When the document 101 is provided to the image processing apparatus 10, the image processing apparatus 10 determines whether the document 101 is embedded with the pattern 107 or 108. When it is determined that the pattern 107 or 108 is embedded, the image processing apparatus 10 determines whether the additional information is detected using the pattern 107 or 108, and performs processing that corresponds to the detected additional information when the additional information is detected. When it is determined that the additional information is not detected using the pattern 107 or 108, the image processing apparatus 10 performs processing that corresponds to the detected pattern 107 or 108.

Further, the image processing apparatus 10 may determine whether processing that corresponds to the detected additional pattern can be specified. When it is determined that the processing cannot be specified, the image processing apparatus 10 may perform processing that corresponds to the detected pattern 107 or 108.

Referring back to FIG. 2, the additional information may be embedded in any desired area of the document 101, for example, in a base area 104 of the document 101. Generally, it is known that the base area 104 is larger in space than a message area 105 such that a large amount of additional information may be embedded in the base area 104. For example, the base area 104 may correspond to a background area having no character data, while the message area 105 may correspond to a foreground area having character data. Alternatively, the additional information may be embedded in a selected portion of the document 101 such as a border of the document 101.

Figure 3A:
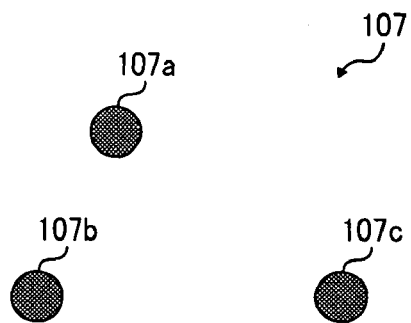
FIG. 3A is an illustration for explaining a first pattern embedded in the document data of FIG. 2.
Figure 3B:
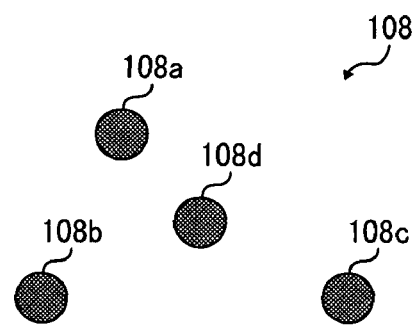
FIG. 3B is an illustration for explaining a second pattern embedded in the document data of FIG. 2.

Referring to FIG. 3A, the first pattern 107 includes three dots 107a, 107b, and 107c. Referring to FIG. 3B, the second pattern 108 includes four dots 108a, 108b, 108c, and 108d. In this example, a portion of the first pattern 107 and a portion of the second pattern 108 have the characteristics that are common. More specifically, in this example, the relative spatial relationship of the dots 108a, 108b, and 108c of the second pattern 108 is the same as the relative spatial relationship of the dots 107a, 107b, and 107c of the first pattern 107. As illustrated in FIGS. 3A and 3B, the second pattern 108 is a pattern that can be generated by adding a dot that corresponds to the dot 108d to the first pattern 107. Since the first pattern 107 and the second pattern 108 partially have the common characteristics, the first pattern 107 and the second pattern 108 can be distinguished by whether the dot 108d is present or not. For simplicity, the first pattern 107 is referred to as the basic pattern 107, while the second pattern 108 is referred to as the additional pattern 108.

The example of the basic pattern 107 and the additional pattern 108 is not limited to the one illustrated in FIGS. 3A and 3B. For example, the number of dots to be included in each one of the basic pattern 107 and the additional pattern 108 or the arrangement of each of the dots in the basic pattern 107 and the additional pattern 108 may be changed, as long as the basic pattern 107 and the additional pattern 108 are distinguishable from each other.

In another example, the first pattern 107 and the second pattern 108 may be the same in number of dots or arrangement of dots, as long as the first pattern 107 and the second pattern 108 are distinguishable, for example, using the color of the dot.

In another example, any desired number of pattern types may be used. For example, more than two types of patterns may be embedded as the additional information.

In this example, the first pattern 107 and the second pattern 108 are embedded in the base area 104 so as to have the relative relationship that reflects the additional information.

In one example, the additional information may be embedded using the relative angle of the basic pattern 107 and the additional pattern 108. In this example, the relative angle of the basic pattern 107 and the additional pattern 108, which is expressed in degrees, is quantized by a predetermined number of quantization stages into a predetermined number of integers. With this quantization, the additional information may be detected with improved accuracy.

Figure 4:
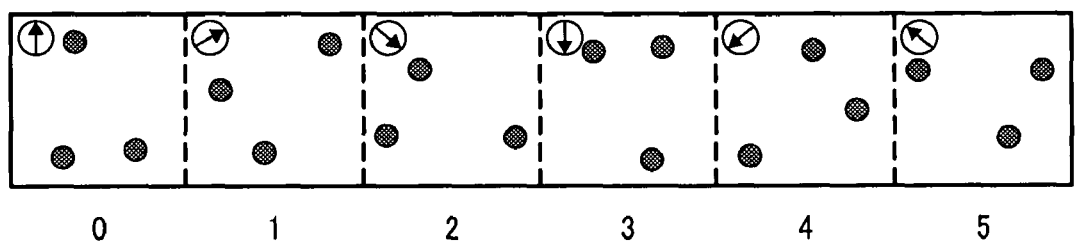
FIG. 4 is an illustration for explaining quantization stages each indicating the rotation or angle of the first pattern of FIG. 3A.

For example, as illustrated in FIG. 4, the basic pattern 107 may be rotated by a unit of 60 degrees such that the total of six integers are generated each indicating the rotation or angle of the basic pattern 107. The integer "0" indicates that the basic pattern 107 having the rotation of 0 degrees. The integer "1" indicates that the basic pattern 107 having the rotation of 60 degrees. The integer "2" indicates that the basic pattern 107 having the rotation of 120 degrees. The integer "3" indicates that the basic pattern 107 having the rotation of 180 degrees. The integer "4" indicates that the basic pattern 107 having the rotation of 240 degrees. The integer "5" indicates that the basic pattern 107 having the rotation of 360 degrees. In FIG. 4, the arrow in the circle in each pattern having the specific rotation is shown as a guide to indicate the corresponding rotation or angle of the pattern.

Figure 5:
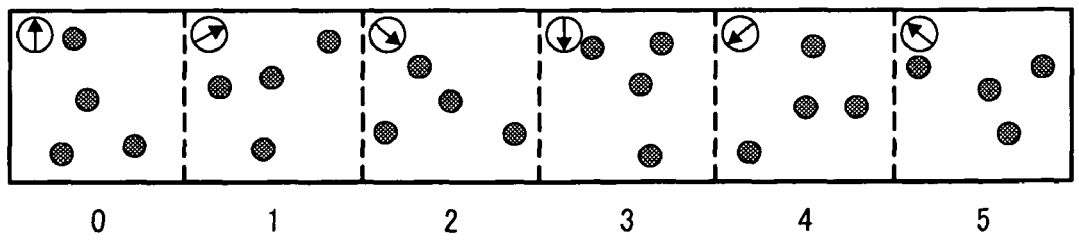
FIG. 5 is an illustration for explaining quantization stages each indicating the rotation or angle of the second pattern of FIG. 3B.

Further, as illustrated in FIG. 5, the additional pattern 108 may be rotated by a unit of 60 degrees such that the total of six integers are generated each indicating the rotation or angle of the additional pattern 108. The integer "0" indicates that the additional pattern 108 having the rotation of 0 degrees. The integer "1" indicates that the additional pattern 108 having the rotation of 60 degrees. The integer "2" indicates that the additional pattern 108 having the rotation of 120 degrees. The integer "3" indicates that the additional pattern 108 having the rotation of 180 degrees. The integer "4" indicates that the additional pattern 108 having the rotation of 240 degrees. The integer "5" indicates that the additional pattern 108 having the rotation of 360 degrees. In FIG. 5, the arrow in the circle in each pattern having the specific rotation is shown as a guide to indicate the corresponding rotation or angle of the pattern.

The additional information may be expressed in terms of relative angle between the basic pattern 107 and the additional pattern 108. Since the angle of the basic pattern 107 and the angle of the additional pattern 108 can be each expressed as one of the integers "0" to "5", the relative angle between the basic pattern 107 and the additional pattern 108 may be expressed as the difference between these two integers. For example, when the difference between the angle of the basic pattern 107 and the angle of the additional pattern 108 is "N", the relative angle may be expressed as "N". In this manner, the relative angle of the basic pattern 107 and the additional pattern 108 may be expressed using any one of the integers 0, 1, 2, 3, 4, and 5. For simplicity, the basic pattern 107 having the rotation of 0 degrees and the additional pattern 108 having the rotation of 0 degrees are caused to be directed to the same direction. In this manner, the relative angle of 0 degrees, or the integer "0", corresponds to the case where the relative angle between the basic pattern 107 and the additional pattern 108 is 0.

The relative angle having the same integer value may correspond to more than one situation. For example, the relative angle of "1" may be obtained when the basic pattern 107 is 0 and the additional pattern 108 is 1, when the basic pattern 107 is 1 and the additional pattern 108 is 2, when the basic pattern 107 is 2 and the additional pattern 108 is 3, or when the basic pattern 107 is 4 and the additional pattern 108 is 5.

Further, in the above-described example of embedding the additional information in the form of relative angle, any number of the basic pattern 107 and the additional pattern 108 may be added in any portion of the document data 101 as long as at least one pair of the basic pattern 107 and the additional pattern 108 is obtainable. The maximum amount of additional information that can be embedded in the document data 101, which is referred to as "I", may be expressed as:

I=log n (bit), with n being the stages of quantization, or the number of integers, for the pattern.

In this example illustrated in FIGS. 4 and 5, since the number n of quantization stages is 6, the maximum amount of additional information I is log 6, or 2.4 bits. Thus, at least more than 2 bits of information can be embedded as the additional information.

In the above-described example, the absolute angles, or the directions, of the basic pattern 107 and the additional pattern 108 are not considered with respect to the orientation of the document data 101. This is partly because the absolute angles, or the directions, of the basic pattern 107 and the additional pattern 108 may be different due to various conditions. In one example, the angle may be different based on the condition in which the document data 101 is read by a scanner. In another example, the angle may be different based on the condition in which the document 101 is output at the time of generating and outputting the document 101 by a plotter. Unlike the absolute angle, the relative angle between the basic pattern 107 and the additional pattern 108 is not influenced by the above-described factors such that the use of relative angle may improve the accuracy in detecting the additional information.

However, when it is known that the orientation of the document 101 is not shifted, the absolute angle of the basic pattern 107 or the additional pattern 108 may be considered. For example, the image processing apparatus 10 may correct the skew, which may be caused when the document 101 is read into image data, before extracting the pattern. In another example, the image processing apparatus 10 may correct the orientation of the document data 101 to be upright position, before extracting the pattern. In such case, in addition to the additional information embedded in the form of relative angle between the basic pattern 107 and the additional pattern 108, other kind of additional information may be embedded using the absolute angle of the basic pattern 107 or the additional pattern 108.

When the absolute angle is considered, the maximum amount of information to be embedded as the additional information, which may be referred to as I, may be expressed as:

I=n*log n (bits), with n being a number of quantization stages for the pattern.

In alternative or addition to using the relative angle and the absolute angle, the arrangement of the basic pattern 107 or the additional pattern 108 may be used to express the additional information.

Figure 6:
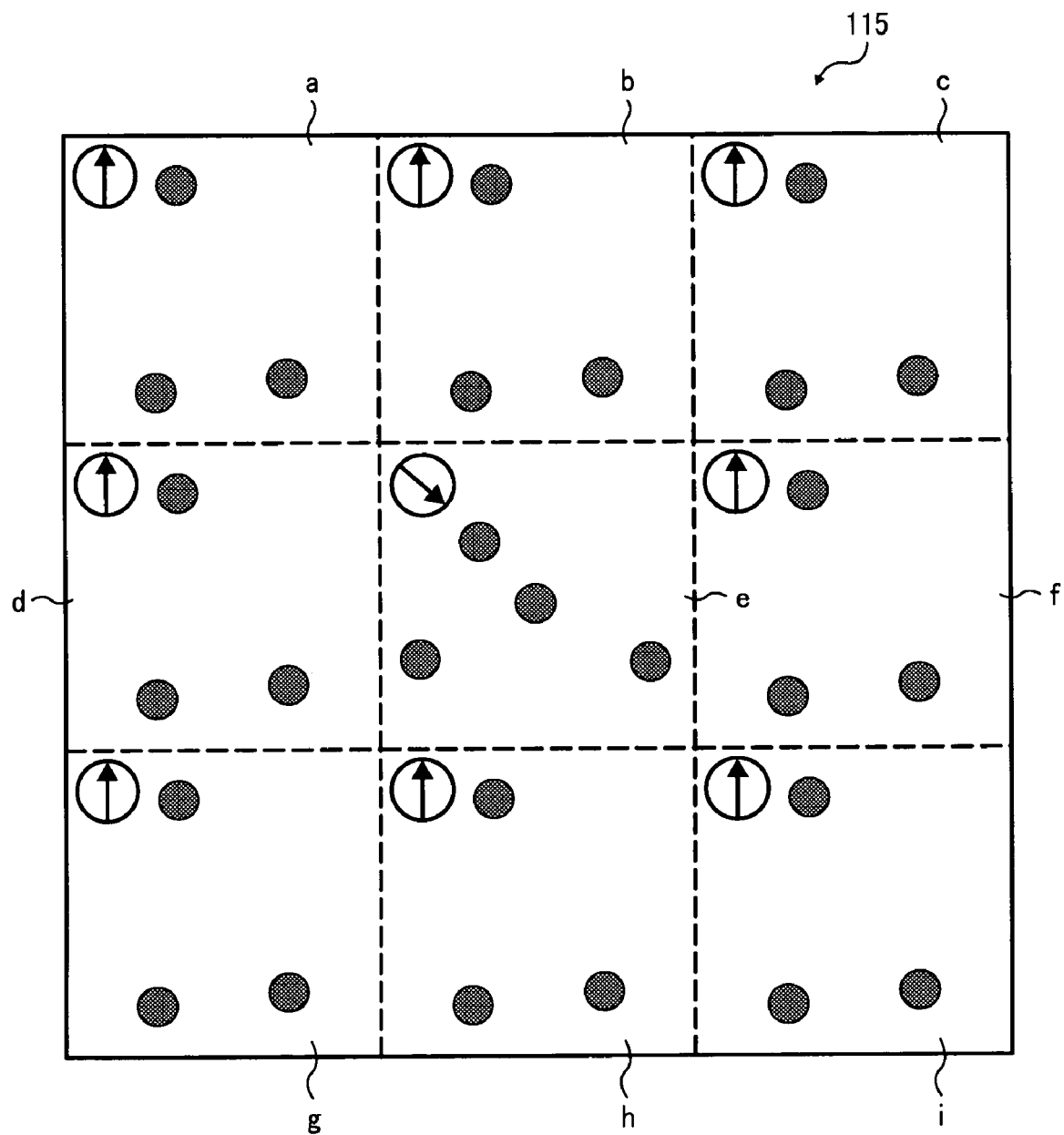
FIG. 6 is an illustration for explaining embedding of additional information in the document data of FIG. 2 using the first pattern of FIG. 3A and the second pattern of FIG. 3B.

FIG. 6 illustrates an example case in which the additional information is embedded in the form of arrangement of the basic pattern 107 and the additional pattern 108, and in the form of angle of the basic pattern 107 and the additional pattern 108. The angle of the basic pattern 107 and the additional pattern 108 may be the relative angle or the absolute angle.

Referring to FIG. 6, the additional information is embedded into a plurality of units that are arranged in 3 columns by 3 rows, with each unit having either the basic pattern 107 or the additional pattern 108. The units a, b, c, d, f, g, h, and i are each embedded with the basic pattern 107. The unit e is embedded with the additional pattern 108. From the relative angle between the basic pattern 107 of any one of the units a, b, c, d, f, g, h, and i and the additional pattern 108 of the unit e, the additional information of "2" can be obtained. Further, assuming that the basic pattern 107 and the additional pattern 108 respectively correspond to the integer "0" and integer "2", the additional information of 9-bit data "000020000" may be obtained.

Figure 7:
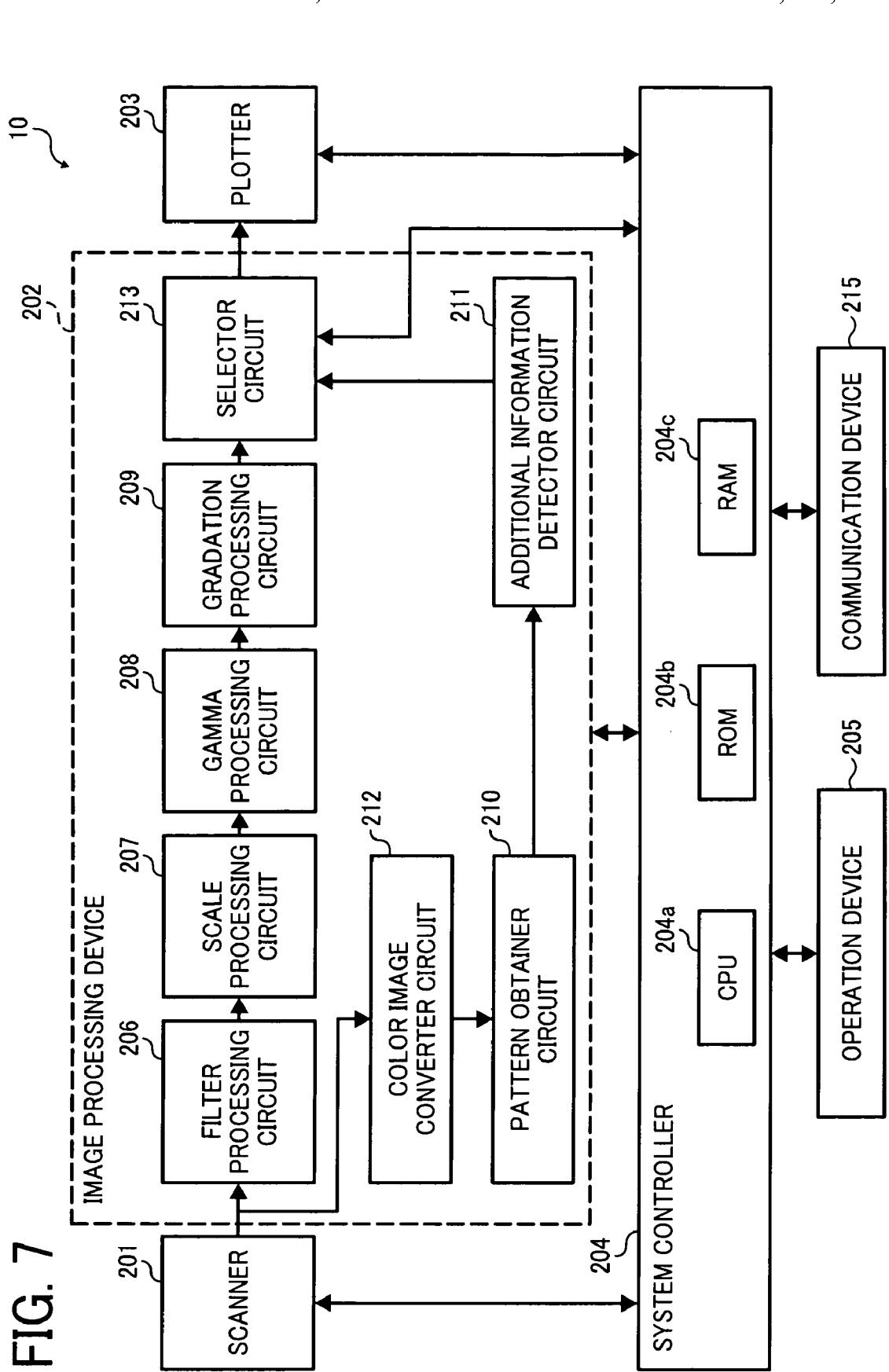
FIG. 7 is a schematic block diagram illustrating a structure of an image processing apparatus, according to an example embodiment of the present invention.

Referring now to FIG. 7, a structure of an image processing apparatus 10 is explained according to an example embodiment of the present invention. The image processing apparatus 10 includes a scanner 201, an image processing device 202, a plotter 203, a system controller 204, and an operation device 205. In addition to the devices illustrated in FIG. 7, the image processing apparatus 10 may further include a communication device 215, which allows the image processing apparatus 10 to transmit or receive data by facsimile, email, or through a network.

The scanner 201 may be implemented by any desired scanner capable of scanning an original document into document data. The scanner 201 may be provided with an automatic document feeder (ADF), which automatically feeds the original document, one sheet by one sheet, to an image reading position of the scanner 201.

The plotter 203 may be implemented by any desired image forming device capable of forming an image on a recording sheet.

The operation device 205 may be implemented by an operation panel having a touch panel display, which provides the function of allowing the user to input a user instruction and the function of displaying information to the user. In addition to the touch panel display, the operation device 205 may include any desired number of keys or buttons.

The system controller 204 includes a central processing unit (CPU) 204*a*, a read only memory (ROM) 204*b*, and a random access memory (RAM) 204*c*. According to an instruction received from the operation device 205, the system controller 204 controls operation performed by, for example, the scanner 201, the image processing device 202, the plotter 203, and the communication device 215. Further, the system controller 204 may cause the operation device 205 to display various information. The system controller 204 may additionally include a nonvolatile memory such as a hard disk, flash memory, or nonvolatile RAM (NVRAM).

The image processing device 202 includes a filter processing circuit 206, a scale processing circuit 207, a gamma processing circuit 208, and a gradation processing circuit 209, which together perform image processing. The filter processing circuit 206 applies preprocessing to the document data 101 including, for example, noise removal. The scale processing circuit 207 applies scaling to the document data 101. The gamma processing circuit 207 applies gamma conversion to the document data 101. The gradation processing circuit 209 adjusts gradation, such as halftone, of the document data 101.

The image processing device 202 further includes a pattern obtainer circuit 210, an additional information detector circuit 211, and a color image converter circuit 212, which together performs pattern detection as described below.

The image processing device 202 further includes a selector circuit 213, which selects printing operation to be performed by the plotter 203 according to an instruction output by the system controller 204.

In example operation, the scanner 201 scans the document 101 of FIG. 1, which is provided in the form of paper document, into the document data 101 according to a user instruction input through the operation device 205. After correcting the orientation of the document data 101 to be in a desired position, the document data 101 is output to the color image converter circuit 212. The scanner 201 does not have to perform orientation correction, for example, when it is known that the additional information is embedded in the form of relative angle between the basic pattern 107 and the additional pattern 108. The scanner 201 outputs the document data 101 in the RGB color space to the color image converter circuit 212.

The color image converter circuit 212 detects a color component of the basic pattern 107 and the additional pattern 108 of the document data 101, and performs image conversion according to the detected color component as necessary. The color image converter circuit 212 further sends the document data 101 to the pattern obtainer circuit 210.

For example, when the color image converter circuit 212 detects that the basic pattern 107 and the additional pattern 108 each have a color component specified in the CMY color space, the color image converter circuit 212 converts the document data 101 from the RGB color space to CMY color space. Further, the color image converter circuit 212 extracts a color component that corresponds to the dot included in the basic pattern 107 and additional pattern 108, and outputs the document data 101 having the extracted color component to the pattern obtainer circuit 210. For example, when the dot has a magenta (M) color component for the basic pattern 107 and additional pattern 108, the cyan (C) color component and the magenta (M) color component are extracted to generate the document data 101 having the C and M color components.

In another example, when the color image converter circuit 212 detects that the basic pattern 107 and the additional pattern 108 each have a color component specified in the RGB color space, the color image converter circuit 212 does not perform any conversion. The color image converter circuit 212 extracts a color component that corresponds to the dot included in the basic pattern 107 and additional pattern 108, and outputs the extracted color component to the pattern obtainer circuit 210. For example, when the dot has a green (G) color component for the basic pattern 107 and additional pattern 108, the green (G) color component is extracted to generate the document data 101 having the G color component.

In this example, the color component to be extracted may be previously determined by default, or according to the use preference that may be set through the operation device 205. The image processing apparatus 10 may store information regarding the color component for the pattern to be detected in any desired memory. As the document data 101 is generated using the extracted color component that corresponds to the dot of the pattern, the dot of the pattern may be detected with improved accuracy.

Figure 8:
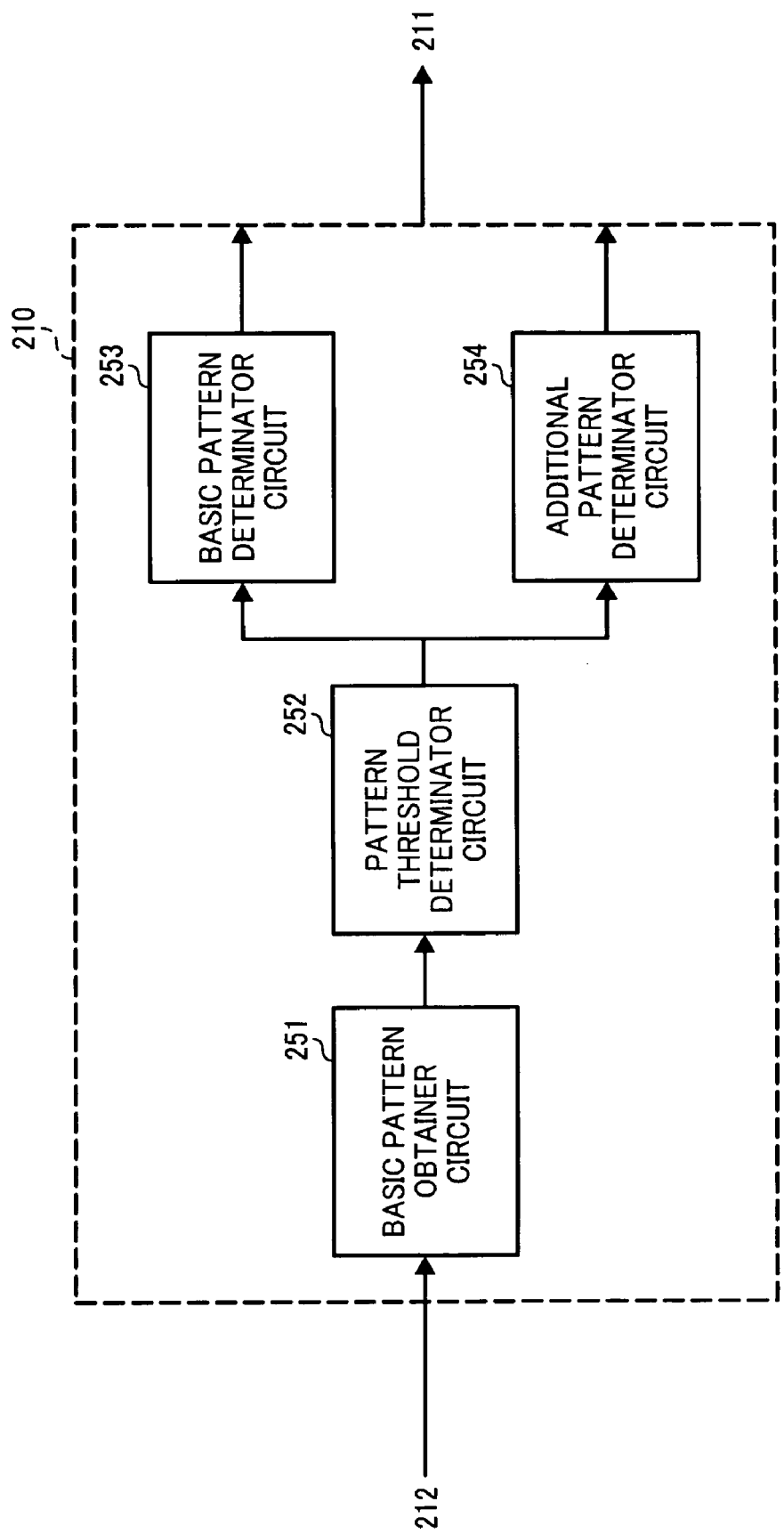
FIG. 8 is a schematic block diagram illustrating a pattern obtainer circuit of the image processing apparatus of FIG. 7.

Referring to FIG. 8, the pattern obtainer circuit 210 includes a basic pattern obtainer circuit 251, a pattern threshold determinator circuit 252, a basic pattern determinator circuit 253, and an additional pattern determinator circuit 254.

The basic pattern obtainer circuit 251 obtains the basic pattern 107 from the document data 101 output from the color image converter circuit 212. The basic pattern 107 may be obtained using any desired pattern obtaining method including, for example, pattern matching. In such case, a pattern image that corresponds to the basic pattern 107 is previously stored in a memory such as the ROM 204$b$ or the NVRAM. The basic pattern obtainer circuit 251 extracts a pattern that matches the pattern image being stored as the basic pattern 107.

Alternatively, the basic pattern obtainer circuit 251 may obtain a pattern that has a predetermined characteristic value as the basic pattern 107. For example, the characteristic value that corresponds to the basic pattern 107 may be stored in a memory such as the ROM 204$b$ or the NVRAM. The basic pattern obtainer circuit 251 may calculate a characteristic value of a pattern obtainable from the document data 101, compare the calculated characteristic value with the predetermined characteristic value, and determine that the pattern that has the predetermined characteristic value as the basic pattern 107. For example, the characteristic value may correspond to a distance between two dots that are included in the basic pattern 107.

In this example, the additional pattern 108 is the pattern in which the dot 107$d$ is added to the basic pattern 107. For this reason, the basic pattern obtainer circuit 251 obtains a portion of the additional pattern 108 that corresponds to the basic pattern 107 as the basic pattern 107.

When the additional information is embedded in the form of the relative angle between the basic pattern 107 and the additional pattern 108, the basic pattern obtainer circuit 251 may extract a pattern that matches one of the patterns each corresponding to a specific quantization stage or integer using the pattern matching method or the characteristic value obtaining method, and store the value of quantization stage or integer in any desired memory for further processing. In such case, the patterns each corresponding to a specific quantization stage or integer, such as the patterns 107 of FIG. 4, may be stored in the memory such as the ROM 204$b$ or the NVRAM. Alternatively, a characteristic value may be obtained for each one of the basic patterns 107 each corresponding to a specific quantization stage or integer, and stored in the memory such as the ROM 204$b$ or the NVRAM.

The pattern threshold determinator circuit 252 counts a total number of patterns obtained by the basic pattern obtainer circuit 251 to generate a count value. As described above, the basic pattern obtainer circuit 251 obtains the basic pattern 107, and a portion of the additional pattern 108 that corresponds to the basic pattern 107. For simplicity, the pattern obtained by the basic pattern obtainer circuit 251 may be referred to as the obtained pattern. Once the count value of the obtained pattern is obtained, the pattern threshold determinator circuit 252 determines whether the count value is equal to or greater than a predetermined threshold value. When it is determined that the count value is equal to or greater than the threshold value, the pattern threshold determinator circuit 252 determines that the basic pattern 107 has been obtained. With this function provided by the pattern threshold determinator circuit 252, the negative influence caused by the noise may be suppressed since the basic pattern obtainer circuit 251 may accidentally recognize a pattern, which is not the basic pattern 107, as the basic pattern 107 due to the noise or any other environmental factors. The pattern threshold determinator circuit 252 may be implemented by, for example, a counter digital circuit or an adder digital circuit.

The basic pattern determinator circuit 253 obtains the basic pattern 107 from the obtained pattern obtained by the basic pattern obtainer circuit 251, and counts a total number of the basic patterns 107 to generate a count value of the basic pattern 107. In order to distinguish between the basic pattern 107 and the additional pattern 108, the basic pattern determinator circuit 253 analyzes the difference between the basic pattern 107 and the additional pattern 108, and obtains the basic pattern 107 using the difference. In this example, the basic pattern determinator circuit 253 obtains any pattern having no dot 108d as the basic pattern 107. When it is determined that the count value is equal to or greater than a predetermined threshold value, the basic pattern determinator circuit 253 determines that the basic pattern 107 is included in the document data 101. Further, the basic pattern determinator circuit 253 obtains characteristic information regarding the basic pattern 107 such as the position of each dot or the angle between two dots, and outputs the characteristic information to the additional information detector circuit 211.

The additional pattern determinator circuit 254 obtains the additional pattern 108 from the obtained pattern, and counts a total number of the additional patterns 108 to generate a count value of the additional pattern 108. In this example, the additional pattern determinator circuit 254 obtains any pattern having the dot 108d as the additional pattern 108. When it is determined that the count value is equal to or greater than a predetermined threshold value, the additional pattern determinator circuit 254 determines that the additional pattern 108 is included in the document data 101. The additional pattern determinator circuit 254 further obtains characteristic information regarding the additional pattern 108 such as the position of each dot or the angle between two dots, and outputs the characteristic information to the additional information detector circuit 211.

Referring to FIG. 7, the additional information detector circuit 211 obtains the results respectively from the basic pattern determinator circuit 253 and the additional pattern determinator circuit 254, and detects the additional information that has been embedded in the document data 101 using the obtained results.

For example, when the additional information is embedded in the form of relative angle between the basic pattern 107 and the additional pattern 108, the additional information detector circuit 211 detects the additional information based on the relative angle, which is obtainable from the characteristic information of the basic pattern 107 and the characteristic information of the additional pattern 108. In one example, the relative angle between the basic pattern 107 and the additional pattern 108 may be obtained for each pair of the basic pattern 107 and the additional pattern 108. Using any statistics, the obtained relative angle having a largest number of counts may be used to detect the additional information.

More specifically, in this example, when the relative angle between the basic pattern 107 and the additional pattern 108 can be expressed as the integer, the additional information may be detected using the equation:

$v=|x-y| \mathrm{Mod} 360/60$, wherein v corresponds to the value of additional information, x corresponds to the angle of the basic pattern 107, y corresponds to the angle of the additional pattern 108, and Mod corresponds to a modular arithmetic. In this example, it is assumed that the angle of each one of the basic pattern 107 and the additional pattern 108 has been quantized for every 60 degrees as described above referring to FIGS. 4 and 5.

For example, when the basic pattern 107 has the angle of 0 degree, and the additional pattern 108 has the angle of 60 degrees, the above-described equation is expressed as:

$v=|0-60| \mathrm{Mod} 360/60=1$. In such case, the additional information is detected as "1".

The additional information detector circuit 211 outputs the detected additional information to the system controller 204. The system controller 204 causes the image processing apparatus 10 to perform processing according to an operation control code that corresponds to the additional information. For example, the system controller 204 refers to a management table of FIG. 9, which is managed by the system controller 204, to determine specific processing that corresponds to the operation control code obtained using the detected additional information. Once the processing is determined, the system controller 204 causes the image processing apparatus 10 to perform the determined processing. The management table of FIG. 9 may be stored in any desired memory inside or outside the image processing apparatus 10.

The management table of FIG. 9 stores the operation control code, and the processing that corresponds to the operation control code. As described above, the additional information to be embedded in the document data 101 may be determined so as to correspond to one of the operation control codes of FIG. 9. Referring to FIG. 9, the "PRINT" operation corresponds to operation of printing the document data 101 using the plotter 203. The "EMAIL" operation corresponds to operation of sending an email using the communication device 215. The "TRANSFER" operation corresponds to operation of sending the document data 101 using the communication device 215 through a network such as a local area network (LAN) or the Internet. The "FAX" operation corresponds to operation of sending the document data 101 in the form of facsimile data using the communication device 215.

Still referring to FIG. 9, the operation control code "−1" indicates that any one of the operations including "PRINT", "EMAIL", "TRANSFER" and "FAX" operations may be performed on the document data 101.

The operation control code "1" indicates that none of the operations including "PRINT", "EMAIL", "TRANSFER" and "FAX" operations can be performed on the document data 101.

The operation control code "2" indicates that the "PRINT" and "FAX" operations cannot be performed on the document data 101, and that the "EMAIL" and "TRANSFER" operations may be performed on the document data 101 as long as the document data 101 is encrypted.

The operation control code "3" indicates that the "PRINT" and "FAX" operations cannot be performed on the document data 101, and that the "EMAIL" and "TRANSFER" operations may be performed on the document data 101 as long as the document data 101 is encrypted. Further, it is required to send the document data 101 after converting into the PDF data that is not printable.

The operation control code "4" indicates that the "PRINT" operation may be performed on the document data 101, and that none of the "EMAIL", "TRANSFER", and "FAX" operation can be performed on the document data 101.

The operation control code "5" indicates that the "PRINT" operation may be performed on the document data 101, and that "FAX" operation cannot be performed on the document data 101. Further, it is indicated that the "EMAIL" and "TRANFER" operations may be performed on the document data 101, as long as the document data 101 is encrypted and sent as PDF data that is not printable.

The operation control code "6" indicates that the "PRINT" operation can be performed on the document data 101. Further, it is indicated that the "EMAIL", "TRANFER", and "FAX" operations may be performed on the document data 101, as long as the document data 101 is to be sent to a destination which is previously registered as an authorized destination. In order to identify the destination, an email address of a specific user may be used.

In this example, the "PRINT" operation that is prohibited to be performed on the document data 101 may correspond to operation of concealing information contained in the document data 101 at the time of outputting the printed sheet, for example, by adding the black solid image to the entire document data. For example, when a user instruction for copying the document 101 is received through the operation device 205, and the additional information that corresponds to the operation control code of prohibiting the "PRINT" operation is detected, the system controller 204 causes the plotter 203 to add the black solid image to conceal information contained in the document data 101 before outputting the document data 101. In order to control output processing of the plotter 203, the system controller 204 may switch a printing mode through the selector 213.

Further, in this example, any one of the "EMAIL", "TRANSFER", and "FAX" operation that is prohibited to be performed on the document data 101 may correspond to operation of not sending the document data 101 even through a user input for requesting the document data 101 to be sent is received. For example, when a user instruction for sending the document data 101 via email is received through the operation device 205, and the additional information that corresponds to the operation control code of allowing the "EMAIL" operation with the authorized destination is detected, the system controller 204 checks an email address input by the user, and causes the communication device 215 to send the document data 101 to the input email address only when the email address is registered as an authorized destination. When the email address is not registered as an authorized destination, the system controller 204 interrupts the operation and causes the operation device 205 to output an error message.

Further, the management table of FIG. 9 may store any other operation control codes such that the operations to be performed by the image processing apparatus 10 are not limited to the above-described examples.

When the additional information detector circuit 211 fails to detect the additional information using the result obtained from the pattern obtainer circuit 210, the additional information detector circuit 211 outputs information regarding the basic pattern 107 to the system controller 204. The system controller 204 obtains an operation control code that is previously assigned to the basic pattern 107, and causes the image processing apparatus 10 to perform operation according to the operation control code that corresponds to the basic pattern 107. In this example, the operation control code "−1" is assigned to the basic pattern 107.

Referring now to FIG. 10, operation of obtaining a pattern from document data 101 and controlling processing based on determination whether additional information is detected from the pattern, performed by the image processing apparatus 10, is explained according to an example embodiment of the present invention. The operation of FIG. 10 may be performed after a user instruction for outputting the document data 101 is input through the operation device 205. In this example, the outputting may correspond to any one of the print operation including copy operation, fax operation, email operation, and transfer operation.

At S1, the basic pattern obtainer circuit 251 obtains the basic pattern 107 from the document data 101 output by the color image converter circuit 212 or by the scanner 201. As described above referring to FIG. 8, the basic pattern obtainer circuit 251 obtains a portion of the additional pattern 108 that corresponds to the basic pattern 107 in addition to the basic pattern 107.

At S2, the pattern threshold determinator circuit 252 determines whether the basic pattern 107 is obtained by the basic pattern obtainer circuit 251. When it is determined that the basic pattern 107 is obtained ("YES" at S2), the operation proceeds to S3. When it is determined that the basic pattern 107 is not obtained ("NO" at S2), the operation ends. In such case, the system controller 104 determines that the document data 101 is not embedded with the pattern or the additional information, and allows a user to perform desired operation on the document data 101 without any restriction.

For example, the pattern threshold determinator circuit 252 counts a total number of patterns obtained by the basic pattern obtainer circuit 251 to generate a count value, every time when the pattern obtained by the basic pattern obtainer circuit 251 is input to the pattern threshold determinator circuit 252. When the count value reaches a predetermined threshold, the pattern threshold determinator circuit 252 determines that a sufficient number of the patterns are obtained. When the count value is less than the predetermined threshold, the pattern threshold determinator circuit 252 may continue counting the number of patterns input by the basic pattern obtainer 251. When there is no document data to be received, and the count value is still less than the predetermined threshold, the pattern threshold determinator circuit 252 determines that the basic pattern 107 is not obtained.

At S4, the basic pattern determinator circuit 253 determines whether a sufficient number of the basic patterns 107 are obtained for further processing. For example, when the basic pattern determinator circuit 253 detects the basic pattern 107 from the pattern obtained by the pattern obtainer circuit 251, the basic pattern determinator circuit 253 increments a count value of the basic patterns 107 by one. When it is determined that the count value reaches a predetermined threshold ("YES" at S4), the operation proceeds to S5. When it is determined that the count value is less than the predetermined threshold ("NO" at S4), the operation repeats S4.

At S5, the basic pattern determinator circuit 253 obtains characteristic information regarding the characteristics of the basic pattern 107 such as the position of each dot or relative angles of two dots. The characteristic information is output to the additional information detector circuit 211.

At S6, the additional pattern determinator circuit 254 determines whether a sufficient number of the additional patterns 108 are obtained for further processing. For example, when the additional pattern determinator circuit 254 detects the additional pattern 108 from the pattern obtained by the pattern obtainer circuit 251, the additional pattern determinator circuit 254 increments a count value of the additional pattern 108 by one. When it is determined that the count value reaches a predetermined threshold ("YES" at S6), the operation proceeds to S7. When it is determined that the count value is less than the predetermined threshold ("NO" at S6), the operation repeats S6.

At S7, the additional pattern determinator circuit 254 obtains characteristic information regarding the additional pattern 108 such as information regarding the position of each dot or relative angle between two dots. The characteristic information is output to the additional pattern detector circuit 211.

In this example, S4 and S5 performed by the basic pattern determinator circuit 253, and S6 and S7 performed by the additional pattern determinator circuit 254 are performed concurrently, thus reducing the overall processing speed.

At S8, the additional pattern detector circuit 211 obtains the processing result, which includes the characteristic information of the basic pattern 107 obtained from the basic pattern determinator circuit 253 and the characteristic information of the additional pattern 108 obtained from the additional pattern determinator circuit 254. Using the obtained result, the additional pattern detector circuit 211 detects the additional information embedded in the document data 101.

At S9, the additional pattern detector circuit 211 determines whether the additional information has been detected. When it is determined that the additional pattern has been detected ("YES" at S9), the operation proceeds to S10. When it is determined that the additional pattern has not been detected ("NO" at S9), the operation proceeds to S11.

At S10, the additional pattern detector circuit 211 outputs the detected additional information to the system controller 204. In this example, the additional information corresponds to one of the operation control codes of FIG. 9. Based on the operation control code that corresponds to the additional information, the system controller 204 controls operation of the image processing apparatus 10.

At S11, the additional pattern detector circuit 211 outputs information regarding the basic pattern 107 to the system controller 204. The system controller 204 obtains an operation control code that corresponds to the basic pattern 107. The operation control code being output at S11 is previously set as the operation control code to be output when the basic pattern 107 is obtained but the additional information is not detected using the basic pattern 107 or any other pattern. Based on the operation control code that corresponds to the basic pattern 107, the system controller 204 controls operation of the image processing apparatus 10.

For example, in order to increase the security level, the operation control code that corresponds to the basic pattern 107 may be set equal to or higher than the operation control code having the highest security level, which is obtainable from the management table of FIG. 9. Referring to FIG. 9, the operation control code "−1" may be selected by the system controller 204 as the operation control code that corresponds to the basic pattern 107. Information regarding the operation control code that is assigned to the basic pattern 107 may be stored in any desired memory of the image processing apparatus 10 such as in the NVRAM.

As described above, when the additional information detector circuit 211 detects the additional information, the system controller 201 controls the image processing apparatus 10 to perform operation according to an operation control code that corresponds to the additional information. When the additional information detector circuit 211 does not detect the additional information, the system controller 201 controls the image processing apparatus 10 to perform operation according to an operation control code that corresponds to the basic pattern 107. With this function, the image processing apparatus 10 is capable of protecting the document data 101 even when the additional information is not detected, as long as the basic pattern 107 is detected.

The operation of FIG. 10 may be performed in various other ways. For example, at S2, the pattern threshold determinator circuit 252 may perform determination within a predetermined time period, which is previously set by default or according to the user preference. In such case, the pattern threshold determinator circuit 252 is additionally provided with a counter circuit capable of counting a time period to generate a time count value. When the time count value reaches the predetermined time period, the pattern threshold determinator circuit 252 determines that the basic pattern 107 is not obtained even when all data is not processed. This may reduce the overall processing time.

In another example, operation of obtaining the additional information is not limited to the one described above referring to FIG. 10. For example, when it is known that the additional information is embedded in the form of absolute angle of the basic pattern 107 or the additional pattern 108, information regarding the relative angle between the basic pattern 107 and the additional pattern 108 does not have to be obtained.

Further, operation of obtaining a pattern or additional information is not limited to the one described above referring to FIG. 10 such that it may be previously determined based on how the additional information is embedded.

Figure 11:
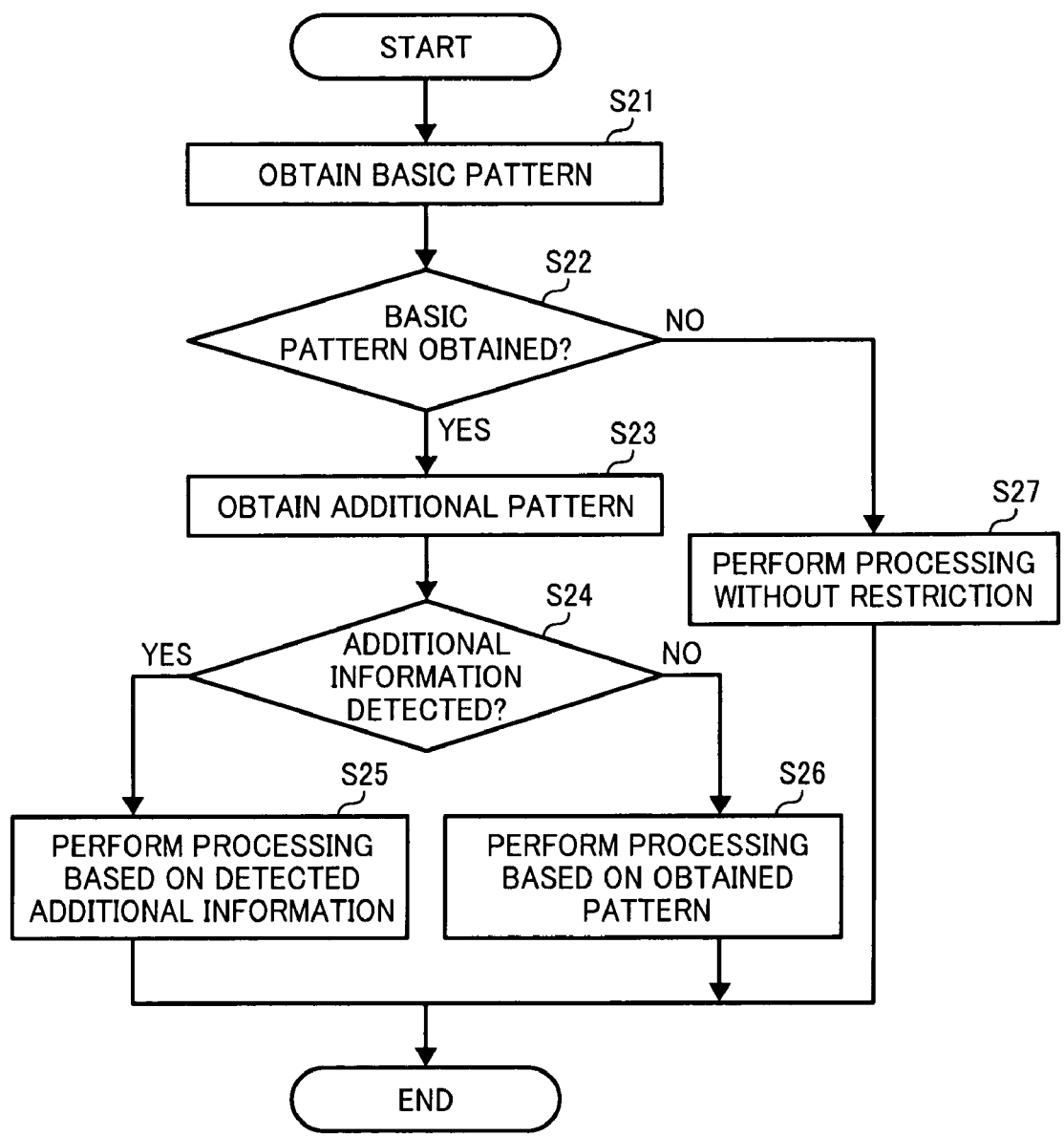
FIG. 11 is a flowchart illustrating operation of detecting additional information and controlling processing based on whether the additional information is detected, performed by the image processing apparatus of FIG. 7, according to an example embodiment of the present invention.

Referring now to FIG. 11, operation of obtaining a pattern from document data 101 and controlling processing based on the determination whether additional information is detected from the pattern, performed by the image processing apparatus 10, is explained according to an example embodiment of the present invention. The operation of FIG. 11 may be performed after a user instruction for outputting the document data 101 is input through the operation device 205. Further, in this example, it is assumed that the additional information that corresponds to an operation control code is embedded using the additional pattern 108.

At S21, the pattern obtainer circuit 210 obtains the basic pattern 107 from the document data 101 output by the color image converter circuit 212 or the scanner 201 in a substantially similar manner as described above referring to S1 of FIG. 10. As described above, a portion of the additional pattern 108 that corresponds to the basic pattern 107 is obtained in addition to the basic pattern 107.

At S22, the pattern obtainer circuit 210 determines whether the basic pattern 107 is obtained in a substantially similar manner as described above referring to S2 of FIG. 10. When it is determined that the basic pattern 107 is obtained ("YES" at S22), the operation proceeds to S23. When it is determined that the basic pattern 107 is not obtained ("NO" at S22), the operation proceeds to S27.

At S27, the pattern obtainer circuit 210 outputs a result to the system controller 204, which indicates that no pattern corresponding to the basic pattern 107 is obtained. The system controller 204 determines that the document data 101 is not the confidential document embedded with the pattern or additional information, and allow any desired processing according to a user instruction input through the operation device 205, and the operation ends.

At S23, the pattern obtainer circuit 210 obtains the additional pattern 108 in a substantially similar manner as described above referring to S6 of FIG. 10. The pattern obtainer circuit 210 further obtains characteristic information regarding the additional pattern 108, and outputs the characteristic information to the additional information detector circuit 211 in a substantially similar manner as described above referring to S7 of FIG. 10.

At S24, the additional information detector circuit 211 determines whether the additional information is detected. When it is determined that the additional information is detected ("YES" at S24), the operation proceeds to S25. When it is determined that the additional information is not detected ("NO" at S24), the operation proceeds to S26.

At S25, the additional pattern detector circuit 211 outputs the detected additional information to the system controller 104. The system controller 104 obtains an operation control code that corresponds to the additional information, and controls operation of the image processing apparatus 10 based on the operation control code in a substantially similar manner as described above referring to S10 of FIG. 10.

At S26, the additional pattern detector circuit 211 outputs information regarding the basic pattern 107 to the system controller 204. The system controller 204 obtains an operation control code that corresponds to the basic pattern 107, and controls operation of the image processing apparatus 10 based on the operation control code that corresponds to the basic pattern 107 in a substantially similar manner as described above referring to S11 of FIG. 10.

Figure 12:
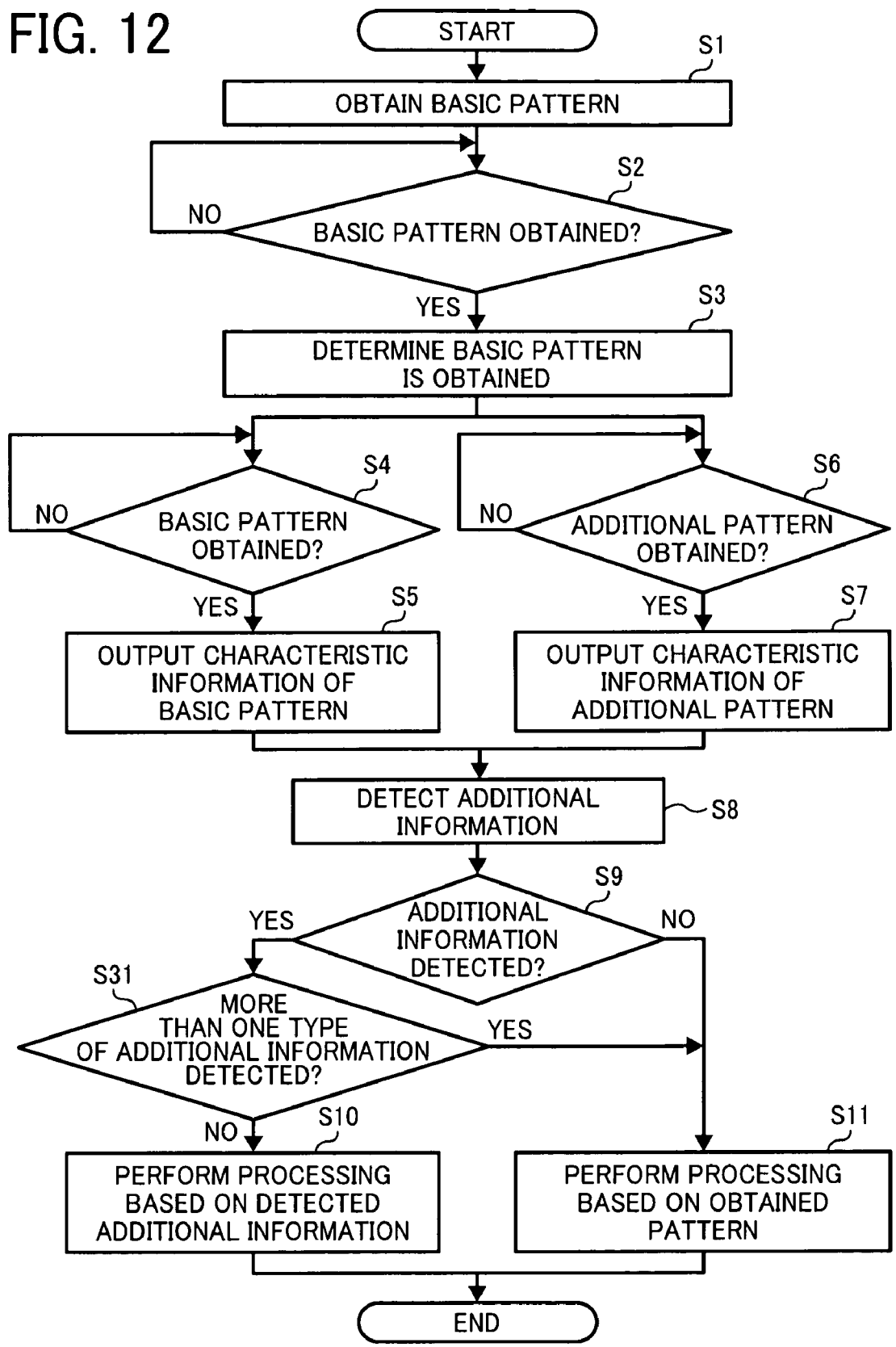
FIG. 12 is a flowchart illustrating operation of detecting additional information and controlling processing based on whether one type of the additional information is detected, performed by the image processing apparatus of FIG. 7, according to an example embodiment of the present invention.

Referring now to FIG. 12, operation of obtaining a pattern from document data 101 and controlling processing based on determination whether additional information is detected from the pattern and determination whether a specific operation control code is identified using the additional information, performed by the image processing apparatus 10, is explained according to an example embodiment of the present invention. The operation of FIG. 12 is substantially similar to the operation of FIG. 10, except for the addition of S31.

At S9, when the additional information detecting circuit 211 determines that the additional information is detected ("YES" at S9), the operation proceeds to S31.

At S31, the additional information detecting circuit 211 determines whether more than one type of additional information has been detected. When it is determined that only one type of additional information is detected ("NO" at S31), the operation proceeds to S10 to output the detected additional information to the system controller 204. At S10, the system controller 204 obtains an operation control code that corresponds to the detected additional information, and controls operation of the image processing apparatus 10 according to the operation control code that corresponds to the detected additional information.

When it is determined that more than one type of additional information are detected ("YES" at S31), the operation proceeds to S11 to output information regarding the basic pattern 107. At S10, the system controller 204 obtains an operation control code that corresponds to the basic pattern 107, and controls operation of the image processing apparatus 10 according to the operation control code that corresponds to the basic pattern 107.

In this example, it is determined that there is more than one type of additional information, when more than one operation control codes can be obtained using the additional information. In such case, the system controller 204 is not able to determine the specific processing to be performed, as there is more than one processing that corresponds to the additional information.

As described above referring to FIG. 12, even when a single operation control code is not obtained, the system controller 211 is caused to control operation of the image processing apparatus 10 according to the operation control code that corresponds to the basic pattern 107. In this manner, even when the image processing apparatus 10 fails to determine specific processing to be performed, the document data 101 is protected without interrupting the current operation.

The operation of FIG. 12 may be performed in various other ways. For example, S31 of determining whether more than one type of additional information is detected may be performed at the same time when S9 of determining whether the additional information is detected is performed. In such case, the operation proceeds to S11 when the additional information is not detected or when more than one type of additional information is detected. The operation proceeds to S10 when only one type of additional information is detected.

In another example, S31 of determining whether there is more than one type of additional information being detected may be performed by the system controller 204, as long as the detected additional information is output to the system controller 204.

Figure 13:
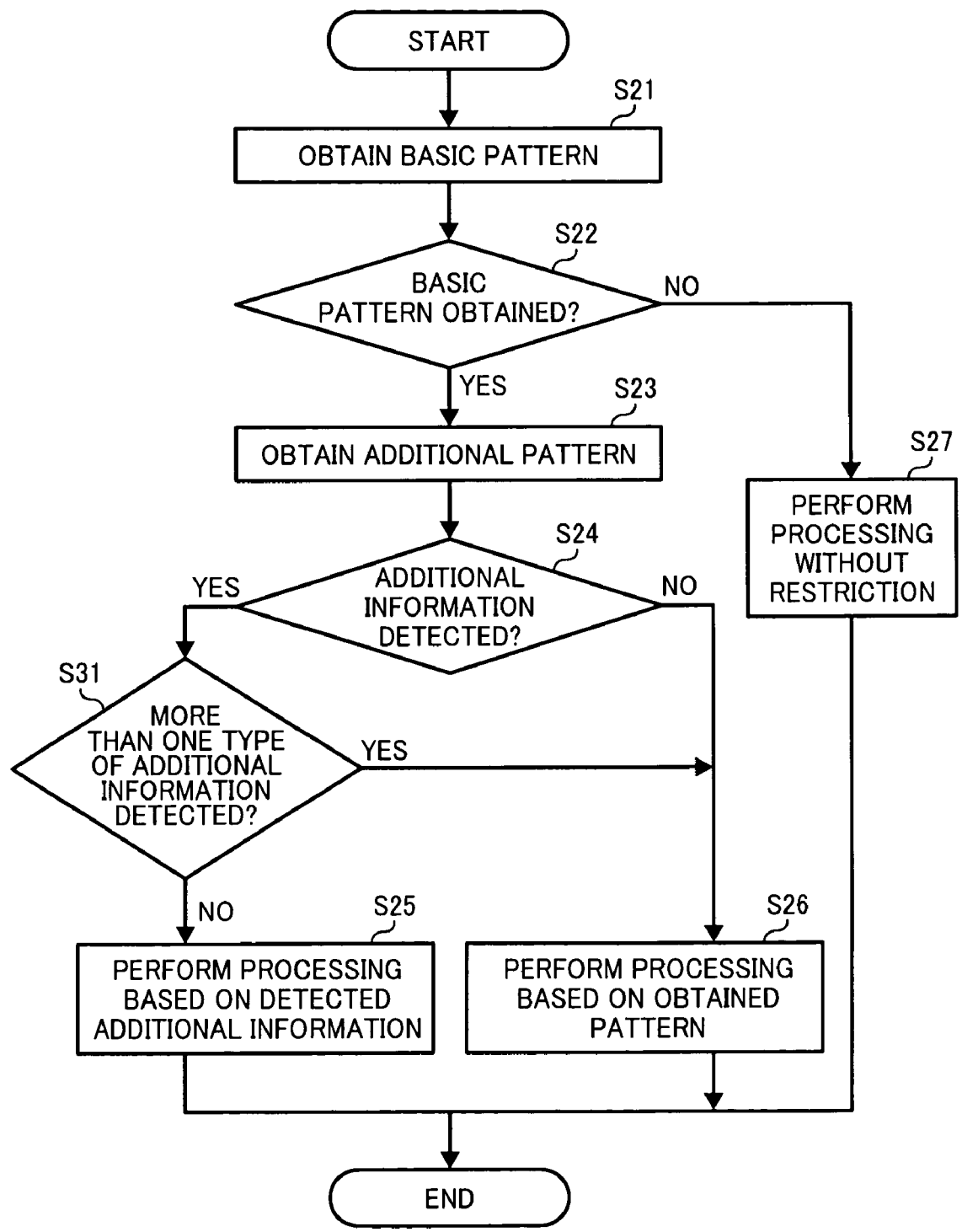
FIG. 13 is a flowchart illustrating operation of detecting additional information and controlling processing based on whether one type of the additional information is detected, performed by the image processing apparatus of FIG. 7, according to an example embodiment of the present invention.

Referring now to FIG. 13, operation of obtaining a pattern from document data 101 and controlling processing based on the determination whether additional information is detected from the pattern and determination whether a specific operation control code is identified using the additional information, performed by the image processing apparatus 10, is explained according to an example embodiment of the present invention. The operation of FIG. 13 is substantially similar to the operation of FIG. 11, except for the addition of S31.

At S14, when the additional information detecting circuit 211 determines that the additional information is detected ("YES" at S14), the operation proceeds to S31.

At S31, the additional information detecting circuit 211 determines whether more than one type of additional information has been detected. When it is determined that more than one type of additional information is detected ("NO" at S31), the operation proceeds to S25 to output the detected additional information to the system controller 204. At S25, the system controller 204 obtains an operation control code that corresponds to the detected additional information, and controls operation of the image processing apparatus 10 according to the operation control code that corresponds to the detected additional information.

When it is determined that more than one type of additional information are detected ("YES" at S31), the operation proceeds to S26 to output information regarding the basic pattern 107. At S26, the system controller 204 obtains an operation control code that corresponds to the basic pattern 107, and controls operation of the image processing apparatus 10 according to the operation control code that corresponds to the basic pattern 107.

Figure 15:
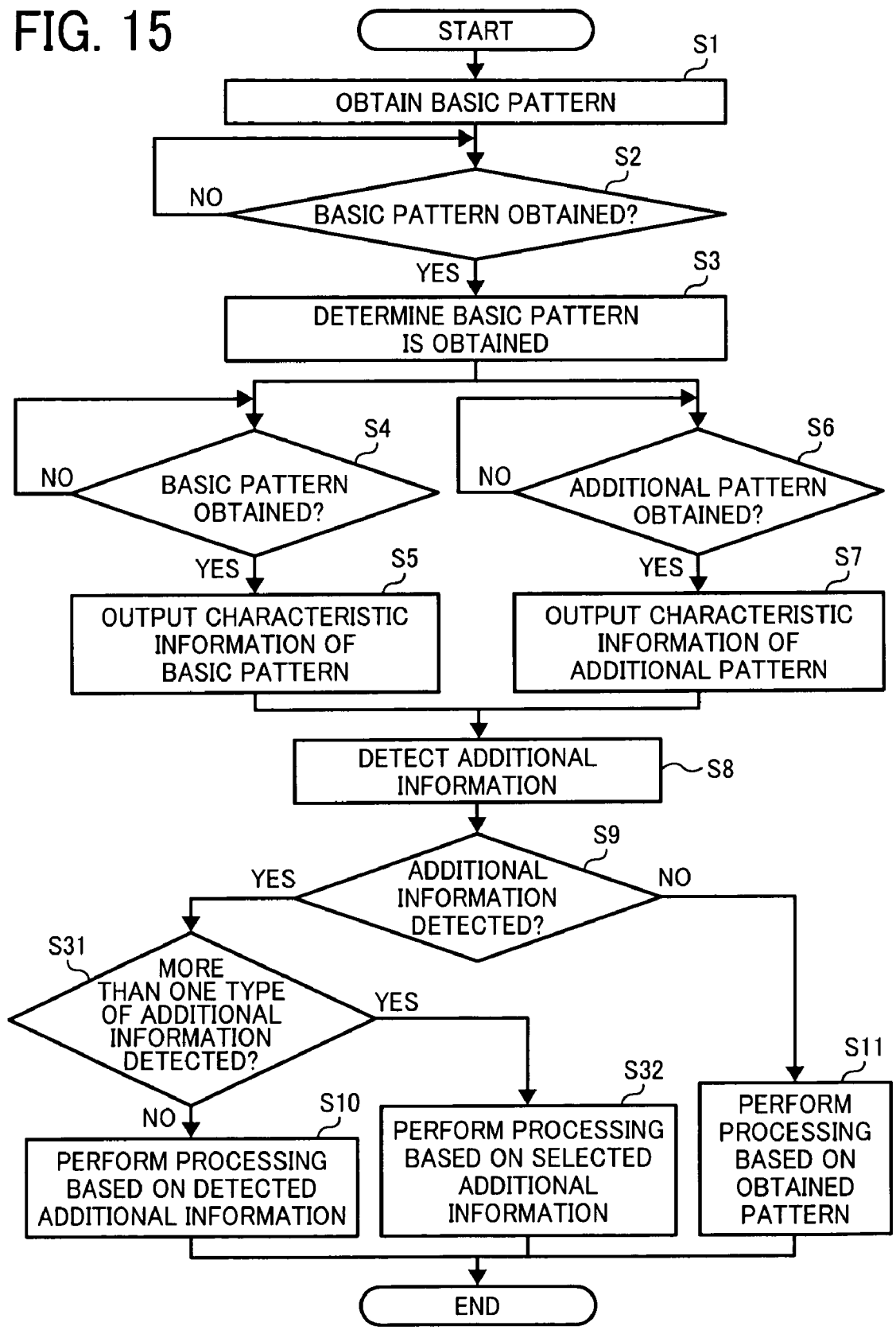
FIG. 15 is a flowchart illustrating operation of detecting additional information and controlling processing based on whether one type of the additional information is detected, performed by the image processing apparatus of FIG. 7, according to an example embodiment of the present invention.

Referring now to FIGS. 14 and 15, operation of obtaining a pattern from document data 101 and controlling processing based on determination whether additional information is detected from the pattern and determination whether a specific operation control code is identified using the additional information, performed by the image processing apparatus 10, is explained according to an example embodiment of the present invention. The operation of FIG. 15 is substantially similar to the operation of FIG. 12, except for the addition of S32. Further, in this example, the image processing apparatus 10 stores or accesses a management table of FIG. 14.

The management table of FIG. 14 stores information that is substantially similar to the information stored in the management table of FIG. 9, except that priority order information ("PRIORITY") is stored for each one of the operation control codes. With the priority order information of FIG. 14, the system controller 204 is able to select one of the operation control codes to be used even when there is more than one operation control code. Specifically, in this example, the operation control codes will be referred by the system controller 204 in the order of 2, 3, 6, 5, 1, 4, and −1. The priority order information of FIG. 14 may be changed according to the user preference. Further, the management table of FIG. 14 may be stored in any desired memory inside or outside the image processing apparatus 10.

Referring back to FIG. 15, when it is determined that there is more than one type of additional information at S31, the operation proceeds to S32.

At S32, the system controller 204 refers to the management table of FIG. 14 to determine which one of the operation control codes that are obtained from the additional information has the highest priority order. Once the operation control code having the highest priority order is selected, the system controller 204 controls operation of the image processing apparatus 10 according to the selected operation control code.

As described above referring to FIGS. 14 and 15, even when there is more than one type of additional information, or there is more than one operation control codes, the image processing apparatus 10 is able to determine specific processing to be performed on the document data 101. In this manner, even when the image processing apparatus 10 fails to determine specific processing to be performed, the document data 101 is protected without interrupting the current operation according to the user preference.

Figure 16:
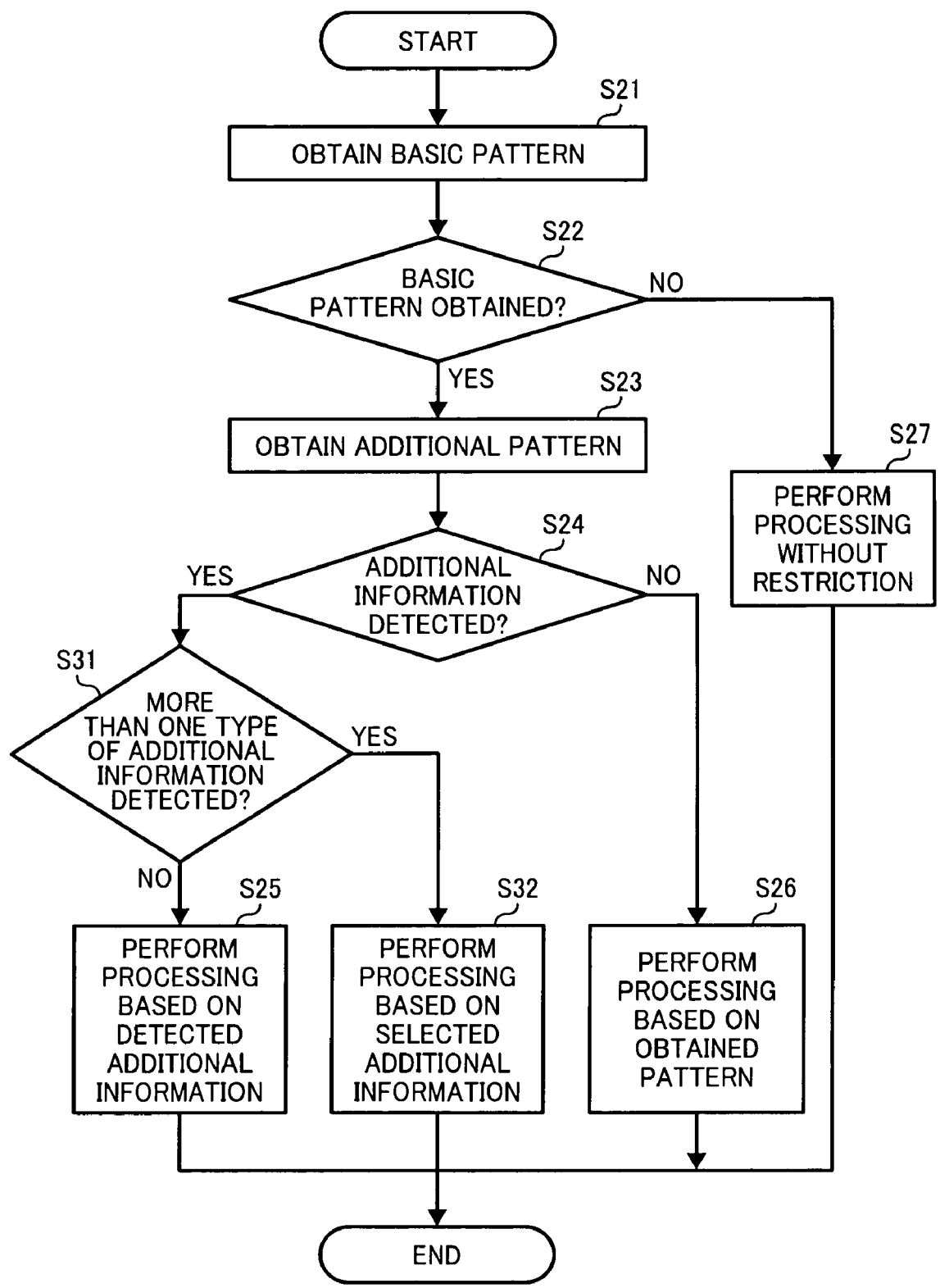
FIG. 16 is a flowchart illustrating operation of detecting additional information and controlling processing based on whether one type of the additional information is detected, performed by the image processing apparatus of FIG. 7, according to an example embodiment of the present invention.

Referring now to FIGS. 14 and 16, operation of obtaining a pattern from document data 101 and controlling processing based on determination whether additional information is detected from the pattern and determination whether a specific operation control code is identified using the additional information, performed by the image processing apparatus 10, is explained according to an example embodiment of the present invention. The operation of FIG. 16 is substantially similar to the operation of FIG. 13, except for the addition of S32. Further, in this example, the image processing apparatus 10 stores or access a management table of FIG. 14.

When it is determined that there is more than one type of additional information at S31, the operation proceeds to S32.

At S32, the system controller 204 refers to the management table of FIG. 14 to determine which one of the operation control codes that are obtained from the additional information has the highest priority order. Once the operation control code having the highest priority order is selected, the system controller 204 controls operation of the image processing apparatus 10 according to the selected system control code.

In the above-described example referring to any one of FIGS. 10 to 16, the pattern obtainer circuit 210 may perform operation of detecting a pattern, section by section, of the document data 101.

For example, as illustrated in FIGS. 17A to 17D, the scanner 201 reads the document data 101, one line by one line, in the main scanning direction Y and the sub-scanning direction X. The document data 101 being read by the scanner 201 is output to the pattern obtainer circuit 210, one line by one line. When the number of lines being obtained reaches a predetermined number m, the pattern obtainer circuit 210 performs operation of obtaining a pattern from the data having the predetermined number m of lines. The pattern obtainer circuit 210 further shifts a portion of the document data 101 to be processed, by a predetermined number of lines n, and repeats operation of obtaining a pattern. In this example, the value of m or n may be previously set by default or according to the user preference. In the example case illustrated in any one of FIGS. 17A to 17D, m is set to 3, and n is set to 1.

Figure 17A:
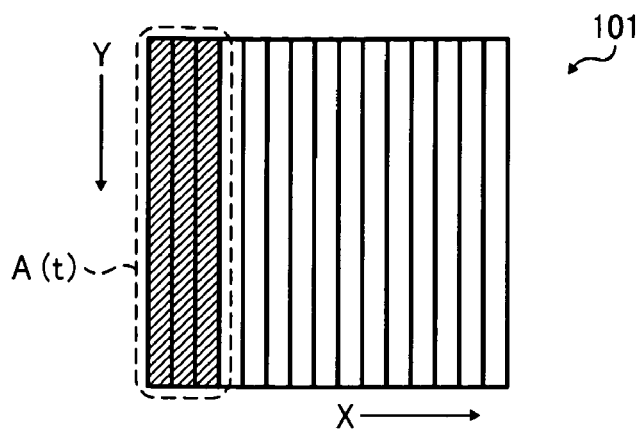
FIG. 17A to 17D are illustrations for explaining operation of detecting a pattern from the document data of FIG. 2, according to an example embodiment of the present invention.

Specifically, referring to FIG. 17A, at a time period t, the pattern obtainer circuit 210 obtains document data A(t), which corresponds to three lines of document data 101. The pattern obtainer circuit 210 further obtains a pattern from the document data A(t) when the pattern is detected in the document data A(t).

Figure 17B:
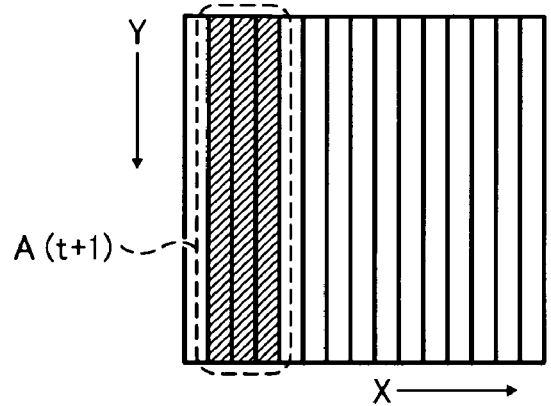

Referring to FIG. 17B, at a time period (t+1), the pattern obtainer circuit 210 obtains document data A(t+1), which is obtained by shifting by one line from the document data A. The pattern obtainer circuit 210 further obtains a pattern from the document data A(t+1) when the pattern is detected in the document data A(t+1).

Figure 17C:
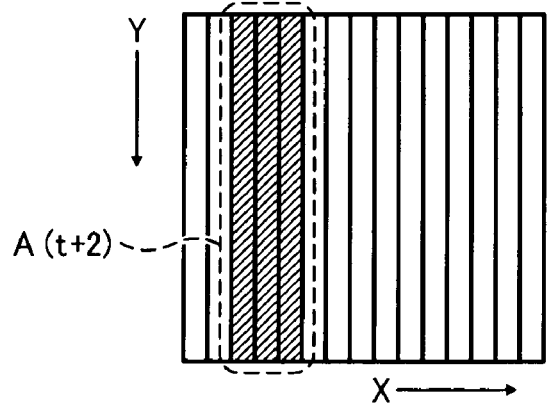

Referring to FIG. 17C, at a time period (t+2), the pattern obtainer circuit 210 obtains document data A(t+2), which is obtained by shifting by one line from the document data A(t+1). The pattern obtainer circuit 210 further obtains a pattern from the document data A(t+2) when the pattern is detected in the document data A(t+2).

Figure 17D:
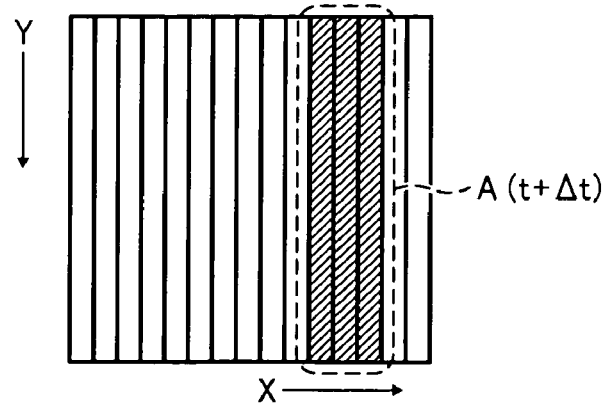

Referring to FIG. 17D, at a time period (t+d), the pattern obtainer circuit 210 obtains document data A(t+d), which is obtained by shifting by a predetermined number of lines corresponding to the value d from the document data A(t+2). The pattern obtainer circuit 210 further obtains a pattern from the document data A(t+d) when the pattern is detected in the document data A(t+d). The symbol d indicates any desired time period.

Figure 18:
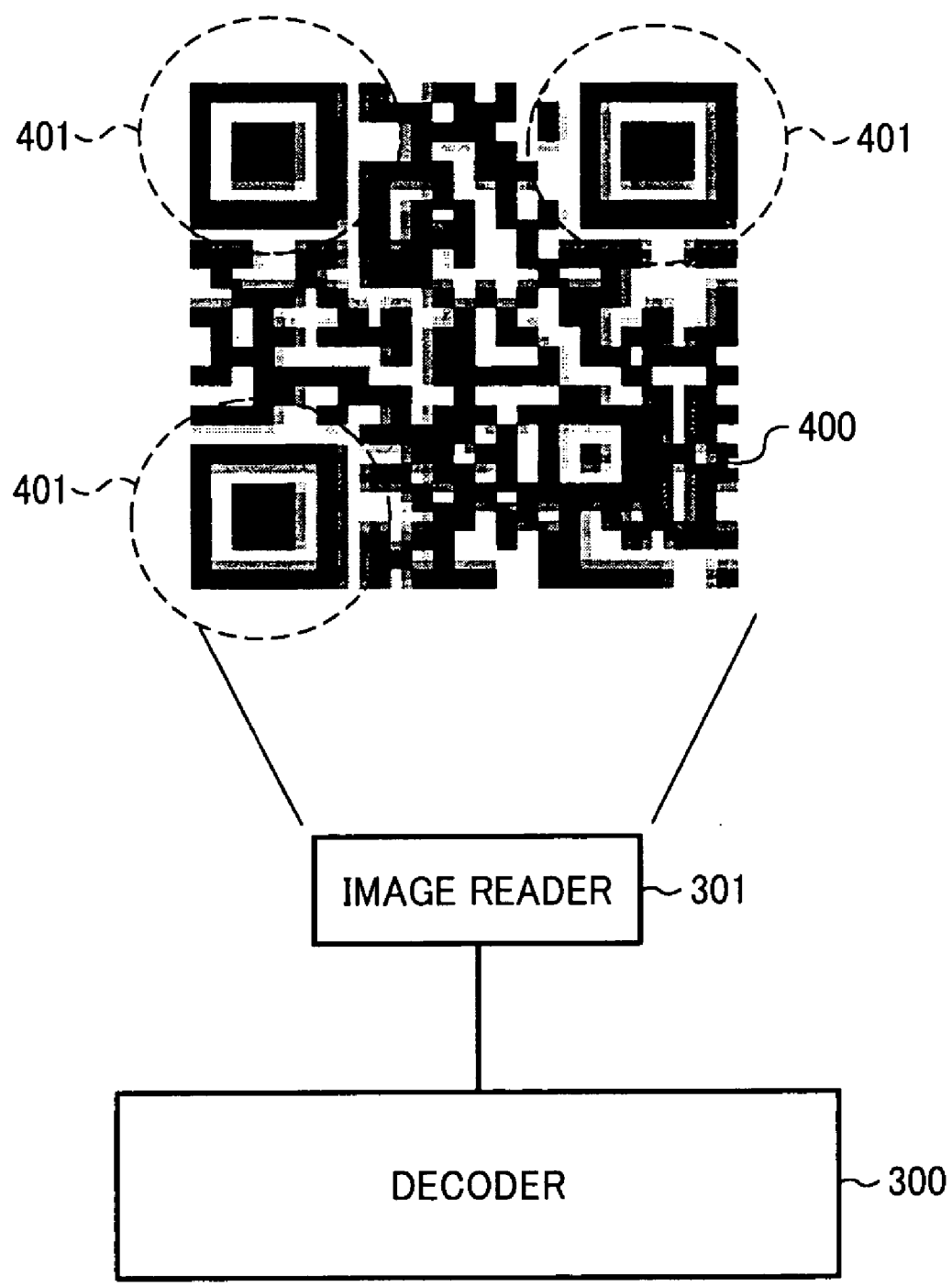
FIG. 18 is an illustration for explaining a bi-dimensional code embedded in the document data of FIG. 2.

As described above, the additional information may be embedded in any desired form other than a combination of the basic pattern 107 and the additional pattern 108. For example, as illustrated in FIG. 18, the additional information may be embedded in the form of bi-dimensional code 400. The bi-dimensional code 400 includes one or more positioning symbols 401, which are provided to indicate a position where the bi-dimensional code 400 is embedded. In this example, the positioning symbol 401 is used as the basic pattern 107, while the portion other than the positioning symbol 401 is used as the additional pattern 108.

More specifically, in this example, the image processing apparatus 10 may be additionally provided with an image reader 301 and a decoder 300. The image reader 301 reads the bi-dimensional code 400, and outputs the obtained data to the decoder 300. The decoder 300 detects additional information, which is embedded in the bi-dimensional code 400.

Figure 19:
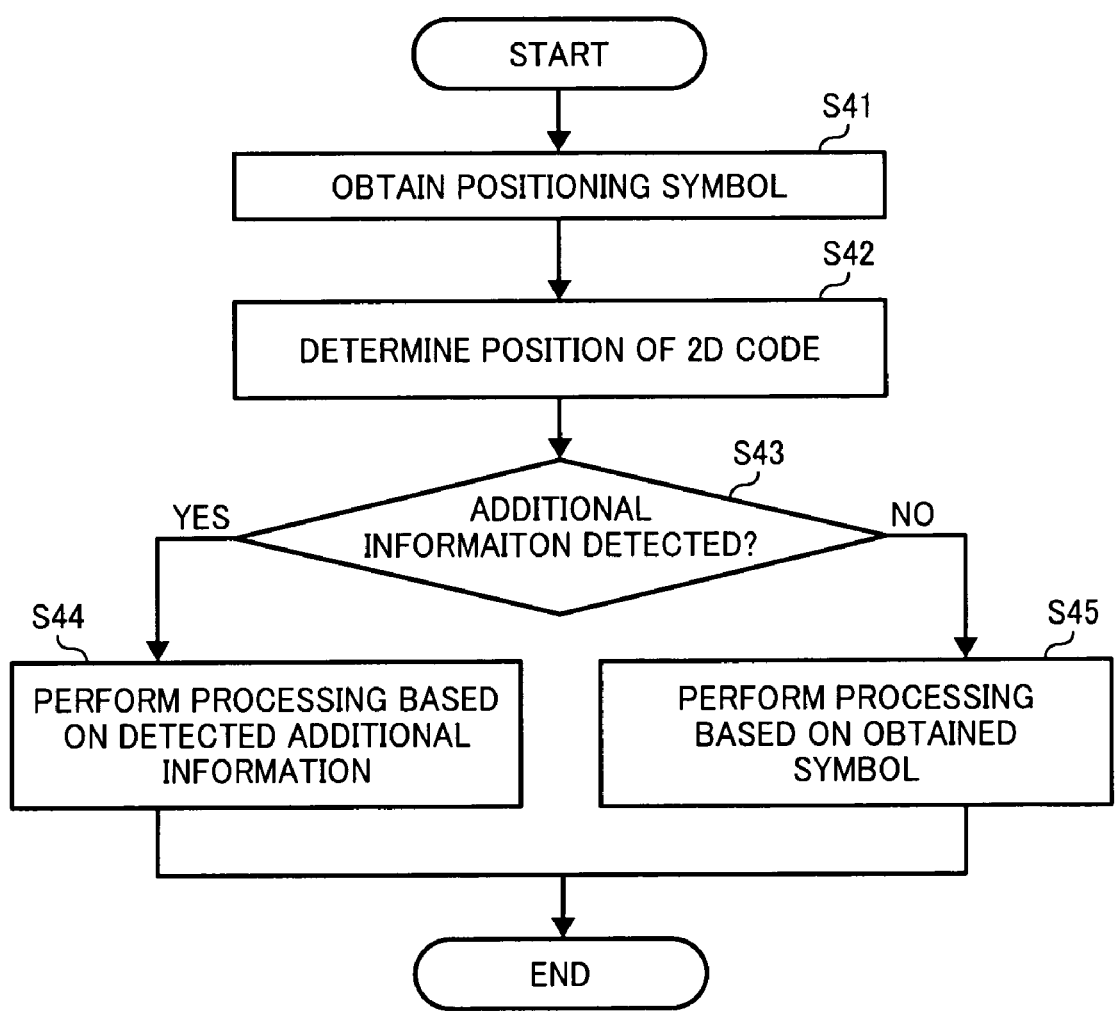
FIG. 19 is a flowchart illustrating operation of detecting additional information and controlling processing based on whether the additional information is detected, according to an example embodiment of the present invention.

Referring now to FIG. 19, operation of obtaining a bi-dimensional code 400 and controlling processing based on whether additional information is detected, is explained according to an example embodiment of the present invention.

At S41, the decoder 300 obtains the bi-dimensional code 400 read by the image reader 301, and obtains the positioning symbol 401.

At S42, the decoder 300 obtains information regarding the position of the bi-dimensional code 400 using the positioning symbol 401. The position may be expressed in any desired coordinate system. In the example case illustrated in FIG. 18, the decoder 300 obtains positional information for each one of the three positioning symbols 401, and uses the obtained position information to determine the position of the bi-dimensional code 400.

At S43, the decoder 300 determines whether additional information is detected from the bi-dimensional code 400. When it is determined that the additional information is detected ("YES" at S43), the operation proceeds to S44. When it is determined that the additional information is not detected ("NO" at S43), the operation proceeds to S45.

At S44, the decoder 300 outputs the detected additional information to the system controller 204 to cause the system controller 204 to perform operation according to an operation control code that corresponds to the additional information.

At S45, the decoder 300 outputs information regarding the detected positioning symbol 401 to the system controller 204 to cause the system controller 204 to perform operation according to an operation control code that corresponds to the positioning symbol 401.

As described above referring to FIGS. 18 and 19, when the additional information is detected from the bi-dimensional code 400, the system controller 201 controls operation according to an operation control code that corresponds to the additional information. When the additional information is not detected from the bi-dimensional code 400, the system controller 201 controls operation according to an operation control code that corresponds to the positioning symbol 401 which functions as the first pattern 107. With this function, the image processing apparatus 10 is capable of protecting the document data 101 even when the additional information is not detected, as long as the positioning symbol 401 is detected.

In the above-described example, the bi-dimensional code is not limited to the bi-dimensional code 400 of FIG. 18. For example, any desired number of positioning symbols 401 may be embedded as long as the position of the bi-dimensional code 400 is detectable.

Numerous additional modifications and variations are possible in light of the above teachings. It is therefore to be understood that within the scope of the appended claims, the disclosure of the present invention may be practiced otherwise than as specifically described herein.

For example, more than one page of the document 101 may be provided to the image processing apparatus 10. For the descriptive purpose, it is assumed that a plurality of documents 101 including a document A, a document B, and a document C is provided to the image processing apparatus 10. In such case, the image processing apparatus 10 performs operation of obtaining a pattern on each one of the document A, document B, and document C, in a substantially similar manner as described above referring to any one of FIGS. 10 to 13, 15, and 16. When the image processing apparatus 10 detects additional information using a pattern obtained from the document A, and when the image processing apparatus 10 detects no additional information using a pattern obtained from the document B or C, the image processing apparatus 10 may perform operation according to an operation control code that corresponds to the obtained pattern.

In another example, the operation of any one of FIGS. 10 to 13, 15, and 16 may be performed by the CPU 204a according to an image processing program having a plurality of instructions. The image processing program may be previously stored in any desired memory such as the ROM 204b, the hard disk, or any other storage device provided inside or outside the image processing apparatus 10 including a removable recording medium such as a floppy disk, optical disc such as CD-ROM or DVD, magneto optical (MO) disc, magnetic disk, or semiconductor memory. The removable recording medium storing the image processing program therein may be distributed as package software. Alternatively, any portion of the image processing program may be distributed through a wired or wireless network. When the power of the image processing apparatus 10 is turned on, the image processing program may be loaded onto the RAM 204c, which functions as a work area of the CPU 204a, to cause the CPU 204a to perform the operation of any one of FIGS. 10 to 13, 15, and 16. In such case, any one of the pattern obtainer circuit 210 and the additional information detector circuit 211 does not have to be provided as long as the functions that are performed by any one of the above-described circuits are carried out by the CPU 204b according to the image processing program.

Figure 20:
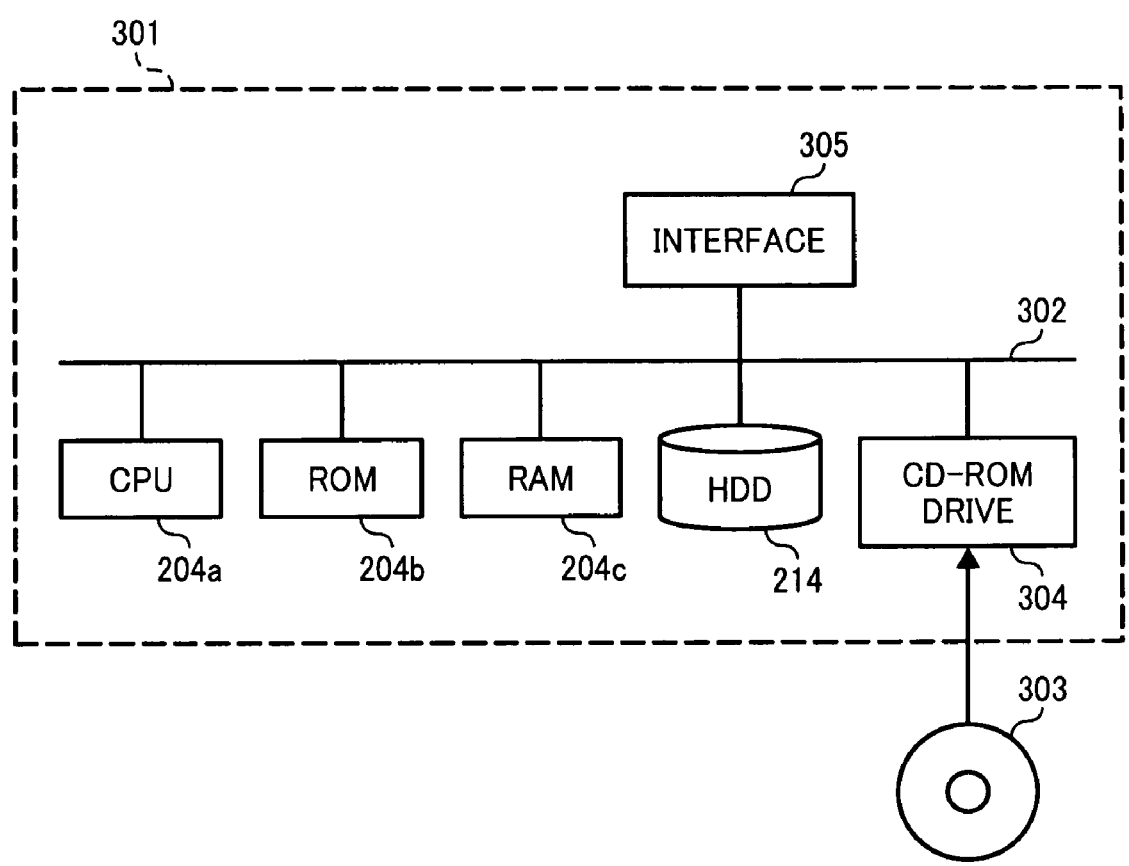
FIG. 20 is a schematic block diagram illustrating a structure of an image processing apparatus, according to an example embodiment of the present invention.

Alternatively, the above-described image processing apparatus may be installed onto a computer, such as a computer 301 of FIG. 20. The computer 301 includes the CPU 204a, the ROM 204b, the RAM 204c, a hard disk drive (HDD) 214, a CD-ROM drive 304, and an interface 305, which are coupled through a system bus 302. The interface 305 may include any desired communication interface, which allows the computer 305 to communicate with any other device through a network. The interface 305 may additionally or alternative include any desired user interface, which allows the computer 305 to communicate with the user.

In this example, the image processing program may be stored in any one of the HDD 214 and ROM 204b. In another example, the image processing program may be stored in a recording medium 303, which may be read by the CD-ROM drive 304. In another example, the image processing program may be downloaded from the network through the interface 305. When the CPU 204b is activated, the image processing program is loaded onto the RAM 204c to cause the CPU 204b to operate as described above referring to any one of FIGS. 10 to 13, 15, and 16.

Specifically, the CPU 204a obtains the document data 101, which may be stored in any desired memory of the computer 301 or obtained through the network. Alternatively, the CPU 204a may obtain the document data 101 from a scanner, when the scanner is connected to the computer 301. The CPU 204a obtains a pattern from the document data 101, and determines whether additional information is detected from the pattern. When it is determined that the additional information is detected, the CPU 204a obtains an operation control code that corresponds to the detected additional information, and performs operation of the computer 301 according to the operation control code that corresponds to the detected additional information. When a user instruction for printing the document data 101 is received through the interface 305, the CPU 204a may cause the operation control code to be output to a printer connected to the computer 301 through the interface 305. Alternatively, the CPU 204a may select not to generate print data or output print data to the printer.

In another example, the operation of any one of FIGS. 10 to 13, 15, and 16 may be performed by an image processing system including any one of the image processing apparatus 10 and the computer 301.

Further, any one of the operation control codes may be obtained in various other ways as long as it is obtainable using the additional information obtained from the pattern or using the pattern itself.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention resides in an image processing apparatus including: means for obtaining a mark from image data, the mark being previously embedded in the image data; means for detecting additional information in the mark; means for determining whether the additional information is detected in the mark to generate a determination result; and means for controlling processing performed by the image processing apparatus with respect to the image data based on the determination result. When the determination result indicates that the additional information is detected, the image processing apparatus is controlled to perform processing that corresponds to the additional information. When the determination result indicates that the additional information is not detected, the image processing apparatus is controlled to perform processing that corresponds to the mark.

In the above-described example, when the additional information detected in the mark includes more than one type of additional information, the means for controlling controls the image processing apparatus to perform processing that corresponds to the mark even when the determination result indicates that the additional information is detected.

In the above-described example, the image processing apparatus may further include: means for storing a plurality of operation control codes, with each operation control code indicating specific processing to be performed by the image processing apparatus with respect to the image data. When the determination result indicates that the additional information is detected, the means for controlling selects one of the plurality of operation control codes using the additional information detected in the mark, and controls the image processing apparatus to perform processing indicated by the selected one of the plurality of operation control codes.

In the above-described example, the image processing apparatus may further include means for storing a plurality of operation control codes, with each operation control code indicating processing to be performed by the image processing apparatus with respect to the image data. When the determination result indicates that the additional information is detected, the means for controlling selects one of the plurality of operation control codes using the additional information detected in the mark, and controls the image processing apparatus to perform processing indicated by the selected one of the plurality of operation control codes.

In the above-described example, the means for storing may further store priority order information with respect to each one of the plurality of operation control codes. When the additional information detected in the mark includes more than one type of additional information, the means for controlling selects one of the plurality of operation control codes that is assigned with the priority order information having a highest priority order, and controls the image processing apparatus to perform processing indicated by the selected one of the plurality of operation control codes.

In the above-described example, the image processing apparatus may further include a scanner device to scan an original image into the image data and to output the image data to the mark obtaining circuit as a plurality of image data sections. The mark obtaining circuit obtains one section of the image data at a time, and obtains the mark from the one section of the image data.

In the above-described example, the mark may include a first pattern, and a second pattern having a portion that has the characteristics common to the characteristics of the first pattern. The mark obtaining circuit obtains the first pattern and the portion of the second pattern having the characteristics common to the characteristics of the first pattern as the mark. When the determination result indicates that the additional information is not detected, the means for controlling controls the image processing apparatus to perform processing that corresponds to the first pattern.

In the above-described example, the mark may include a positioning symbol indicating the position of the mark. When the determination result indicates that the additional information is not detected, the means for controlling controls the image processing apparatus to perform processing that corresponds to the positioning symbol.

In another example, the present invention resides in a recording medium storing a plurality of instructions which cause a computer to perform any one of the above-described image processing methods.

What is claimed is:

1. An image processing apparatus, comprising:
a mark obtaining circuit configured to obtain a mark from image data, the mark being previously embedded in the image data, the mark including,
a first pattern, and
a second pattern having a portion that has the characteristics common to the characteristics of the first pattern, the mark obtaining circuit being configured to obtain, as the mark, the first pattern and the portion of the second pattern having the characteristics common to the characteristics of the first pattern;
an additional information detector circuit configured to detect additional information in the mark; and
a controller configured to determine whether the additional information is detected in the mark to generate a determination result and to control processing performed by the image processing apparatus with respect to the image data based on the determination result; and
a storage device configured to store processing information corresponding to the first pattern and processing information corresponding to the additional information, wherein:
when the determination result indicates that the additional information is detected, the controller is configured to control the image processing apparatus to perform processing in accordance with the stored processing information that corresponds to the additional information, and
when the determination result indicates that the additional information is not detected, the controller is configured to control the image processing apparatus to perform processing in accordance with the stored processing information that corresponds to the first pattern.

2. The image processing apparatus of claim 1, wherein:
when the additional information detected in the mark includes more than one type of additional information, the controller is configured to control the image processing apparatus to perform processing that corresponds to the mark even when the determination result indicates that the additional information is detected.

3. The image processing apparatus of claim 1, further comprising:
the processing information corresponding to the additional information includes a plurality of operation control codes, with each operation control code indicating specific processing to be performed by the image processing apparatus with respect to the image data, wherein:
when the determination result indicates that the additional information is detected, the controller is configured to select one of the plurality of operation control codes using the additional information detected in the mark, and to control the image processing apparatus to perform processing indicated by the selected one of the plurality of operation control codes, and
when the determination result indicates that the additional information is not detected, the controller is configured to select a control code that is stored in association with the first pattern.

4. The image processing apparatus of claim 3, wherein:
the storage device is further configured to store priority order information with respect to each one of the plurality of operation control codes, and
when the additional information detected in the mark includes more than one type of additional information, the controller is further configured to select one of the plurality of operation control codes that is assigned with the priority order information having a highest priority order, and to control the image processing apparatus to perform processing indicated by the selected one of the plurality of operation control codes.

5. The image processing apparatus of claim 1, further comprising:
a scanner device configured to scan an original image into the image data and to output the image data to the mark obtaining circuit as a plurality of image data sections, wherein:
the mark obtaining circuit is configured to obtain one section of the image data at a time, and to obtain the mark from the one section of the image data.

6. The image processing apparatus of claim 1, wherein the additional information is detected from the second pattern.

7. The image processing apparatus of claim 1, wherein the additional information is detected from the relationship between the first pattern and a portion of the second pattern having characteristics in common with the first pattern.

8. The image processing apparatus of claim 3, wherein the plurality of operation control codes represent a level of security of the processing designated by the corresponding processing information, and the control code that corresponds to the first pattern is set to designate a security level equal to or higher than the highest security level represented by the plurality of operation control codes.

9. An image processing system, comprising:
a processor;
a storage device configured to store processing information corresponding to the first pattern and processing information corresponding to the additional information; and
a storage device configured to store a plurality of instructions which, when activated by the processor, cause the processor to:
obtain a mark from image data, the mark being previously embedded in the image data, the mark including,
a first pattern, and
a second pattern having a portion that has the characteristics common to the characteristics of the first pattern, and obtaining, as the mark, the first pattern and the portion of the second pattern having the characteristics common to the characteristics of the first pattern;
detect additional information in the mark;
determine whether the additional information is detected in the mark to generate a determination result; and
control processing performed by the image processing system with respect to the image data based on the determination result, wherein:
when the determination result indicates that the additional information is detected, the processor is configured to control the image processing system to perform processing in accordance with the stored processing information that corresponds to the additional information, and
when the determination result indicates that the additional information is not detected, the processor is configured to control the image processing system in accordance with the stored processing information to perform processing that corresponds to the first pattern.

10. The image processing system of claim 9, wherein:
when the additional information detected in the mark includes more than one type of additional information, the processor is configured to control the image processing system to perform processing that corresponds to the mark even when the determination result indicates that the additional information is detected.

11. The image processing system of claim 9, wherein, the processing information corresponding to the additional information includes a plurality of operation control codes, with each operation control code indicating specific processing to be performed by the image processing system with respect to the image data, wherein:
when the determination result indicates that the additional information is detected, the processor is configured to select one of the plurality of operation control codes using the additional information detected in the mark, and to control the image processing system to perform processing indicated by the selected one of the plurality of operation control codes, and
when the determination result indicates that the additional information is not detected, the controller is configured to select a control code that is stored in association with the first pattern.

12. The image processing system of claim 11, wherein:
the storage device is further configured to store priority order information with respect to each one of the plurality of operation control codes, and
when the additional information detected in the mark includes more than one type of additional information, the processor is configured to select one of the plurality of operation control codes that is assigned with the priority order information having a highest priority order, and to control the image processing apparatus to perform processing indicated by the selected one of the plurality of operation control codes.

13. The image processing system of claim 9, wherein the additional information is detected from the second pattern.

14. The image processing system of claim 9, wherein the additional information is detected from the relationship between the first pattern and a portion of the second pattern having characteristics in common with the first pattern.

15. The image processing system of claim 11, wherein the plurality of operation control codes represent a level of security of the processing designated by the corresponding processing information, and the control code that corresponds to the first pattern is set to designate a security level equal to or higher than the highest security level represented by the plurality of operation control codes.

16. An image processing method, comprising:
storing processing information corresponding to a first pattern and processing information corresponding to additional information
obtaining a mark from image data, the mark being previously embedded in the image data, the mark including, the first pattern, and
a second pattern having a portion that has the characteristics common to the characteristics of the first pattern, and obtaining, as the mark, the first pattern and the portion of the second pattern having the characteristics common to the characteristics of the first pattern;
detecting the additional information in the mark;
determining whether the additional information is detected in the mark to generate a determination result; and
controlling processing performed by an image processing apparatus with respect to the image data based on the determination result, wherein:
when the determination result indicates that the additional information is detected, the step of controlling controls the image processing apparatus to perform processing in accordance with the stored processing information that corresponds to the additional information, and
when the determination result indicates that the additional information is not detected, the step of controlling controls the image processing apparatus to perform processing in accordance with the stored processing information that corresponds to the first pattern.

17. The image processing method of claim 16, further comprising:
    determining whether the additional information detected in the mark includes more than one type of additional information to generate an additional determination result; and
    when the additional determination result indicates that the additional information detected in the mark includes more than one type of additional information, the controlling processing performed by an image processing apparatus with respect to the image data based on the determination result comprises:
    controlling the image processing apparatus to perform processing that corresponds to the mark even when the determination result indicates that the additional information is detected.

18. The image processing method of claim 16, wherein the processing information corresponding to the additional information includes,
    a plurality of operation control codes, with each operation control code indicating specific processing to be performed by the image processing apparatus with respect to the image data, and
    when the determination result indicates that the additional information is detected, the controlling processing performed by an image processing apparatus with respect to the image data based on the determination result includes,
        selecting one of the plurality of operation control codes using the additional information detected in the mark, and
        controlling the image processing apparatus to perform processing indicated by the selected one of the plurality of operation control codes; and
    when the determination result indicates that the additional information is not detected, the controlling processing performed by an image processing apparatus with respect to the image data based on the determination result includes
    selecting a control code that is stored in association with the first pattern.

19. The image processing method of claim 18, further comprising:
    storing priority order information with respect to each one of the plurality of operation control codes, and
    when the additional determination result indicates that the additional information detected in the mark includes more than one type of additional information, the controlling processing performed by an image processing apparatus with respect to the image data based on the determination result comprises:
    selecting one of the plurality of operation control codes that is assigned with the priority order information having a highest priority order; and
    controlling the image processing apparatus to perform processing indicated by the selected one of the plurality of operation control codes.

* * * * *